(12) United States Patent
Waki et al.

(10) Patent No.: US 7,194,758 B1
(45) Date of Patent: Mar. 20, 2007

(54) DIGITAL BROADCAST SYSTEM AND ITS COMPONENT DEVICES THAT PROVIDE SERVICES IN ACCORDANCE WITH A BROADCAST WATCHED BY VIEWERS

(75) Inventors: Hiroyuki Waki, Hirakata (JP); Tatsuya Shimoji, Neyagawa (JP); Shusuke Haruna, Itami (JP); Chikara Yoshida, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/561,207

(22) Filed: Apr. 28, 2000

(30) Foreign Application Priority Data

May 24, 1999 (JP) .................................. 11-142844

(51) Int. Cl.
*H04N 7/16* (2006.01)
*H04N 7/173* (2006.01)
*H04H 9/00* (2006.01)

(52) U.S. Cl. .......................... 725/141; 725/9; 725/86; 725/87; 725/104; 725/133; 725/13

(58) Field of Classification Search ................ 725/8, 725/9–21, 22–24, 31, 133, 141, 153, 106, 725/121, 122, 86, 87, 104
See application file for complete search history.

(56) References Cited

U.S. PATENT DOCUMENTS

| | | | |
|---|---|---|---|
| 4,910,767 A | 3/1990 | Brugliera et al. | |
| 5,181,107 A | 1/1993 | Rhoades | |
| 5,570,415 A | 10/1996 | Stretton et al. | |
| 5,649,284 A * | 7/1997 | Yoshinobu | 725/114 |
| 5,671,267 A | 9/1997 | August et al. | |
| 5,684,526 A * | 11/1997 | Yoshinobu | 725/131 |
| 5,822,324 A | 10/1998 | Kostresti et al. | |
| 5,880,720 A * | 3/1999 | Iwafune et al. | 725/24 |
| 5,898,919 A | 4/1999 | Yuen | |
| 5,905,523 A * | 5/1999 | Woodfield et al. | 725/99 |
| 6,467,089 B1 * | 10/2002 | Aust et al. | 725/13 |
| 2003/0022643 A1 * | 1/2003 | Djupsjobacka et al. | 455/158.1 |

FOREIGN PATENT DOCUMENTS

| | | |
|---|---|---|
| JP | 856348 | 2/1996 |
| JP | 8125624 | 5/1996 |

* cited by examiner

*Primary Examiner*—Chris Kelley
*Assistant Examiner*—Usha Raman

(57) ABSTRACT

A digital broadcast system includes a receiving device, one or more communication devices, and a broadcast station device. The receiving device includes a receiver for receiving a digitally broadcast program; a presentor for presenting the program received by the receiver to a viewer; and means for sending program ID information that specifies either the presented program or a program related to the presented program. Each of the communication devices receives the sent program ID information and sends communication device ID information to the broadcast station device together with the received program ID information. The broadcast station device receives the program ID information and the device ID information, and sends viewer targeted program specific service information to each of the communication devices identified by the received device ID information.

5 Claims, 33 Drawing Sheets

FIG. 4

| PHONE NUMBER LENGTH DESCRIPTION FIELD(1BYTE) | 0x0B |
| --- | --- |
| OPERATING DEVICE PHONE NUMBER DESCRIPTION FIELD(VARIABLE LENGTH) | "09087654321" |
| PHONE NUMBER LENGTH DESCRIPTION FIELD(1BYTE) | 0x09 |
| HOST STATION PHONE NUMBER DESCRIPTION FIELD(VARIABLE LENGTH) | "066789012" |

FIG. 10

| | |
|---|---|
| 801 — NOTIFICATION TAG FIELD (1byte/0x00) | 0x00 |
| 802 — nid DESCRIPTION FIELD (2byte) | 0x1234 |
| 803 — tid DESCRIPTION FIELD (2byte) | 0x0005 |
| 804 — sid DESCRIPTION FIELD (2byte) | 0x0006 |
| 805 — eid DESCRIPTION FIELD (2byte) | 0x7890 |

FIG. 11

| | |
|---|---|
| 901 — NOTIFICATION TAG FIELD (1byte/0x01) | 0x01 |
| 902 — nid DESCRIPTION FIELD (2byte) | 0x1234 |
| 903 — tid DESCRIPTION FIELD (2byte) | 0x0005 |
| 904 — sid DESCRIPTION FIELD (2byte) | 0x0006 |
| 905 — eid DESCRIPTION FIELD (2byte) | 0x7890 |
| 906 — PHONE NUMBER LENGTH DESCRIPTION FIELD (1byte) | 0x0B |
| 907 — PHONE NUMBER DESCRIPTION FIELD (VARIABLE LENGTH) | "09087654321" |

FIG. 24

| | | |
|---|---|---|
| 1901 | NOTIFICATION TAG FIELD (1byte/0x02) | 0x02 |
| 1902 | nid DESCRIPTION FIELD (2byte) | 0x1234 |
| 1903 | tid DESCRIPTION FIELD (2byte) | 0x0005 |
| 1904 | sid DESCRIPTION FIELD (2byte) | 0x0006 |
| 1905 | eid DESCRIPTION FIELD (2byte) | 0x7890 |
| 1906 | QUIZ ANSWER FIELD (1byte) | 80 |
| 1907 | PHONE NUMBER LENGTH DESCRIPTION FIELD (1byte) | 0x0B |
| 1908 | PHONE NUMBER DESCRIPTION FIELD (VARIABLE LENGTH) | "09087654321" |

FIG. 28

| | | |
|---|---|---|
| 4501 | NOTIFICATION TAG FIELD(1byte/0x0A) | 0x0A |
| 4502 | nid DESCRIPTION FIELD(2byte) | 0x1234 |
| 4503 | tid DESCRIPTION FIELD(2byte) | 0x0005 |
| 4504 | sid DESCRIPTION FIELD(2byte) | 0x0006 |
| 4505 | eid DESCRIPTION FIELD(2byte) | 0x7890 |

FIG. 29

| | | |
|---|---|---|
| 3101 | NOTIFICATION TAG FIELD (1byte/0x05) | 0x05 |
| 3102 | nid DESCRIPTION FIELD (2byte) | 0x1234 |
| 3103 | tid DESCRIPTION FIELD (2byte) | 0x0005 |
| 3104 | sid DESCRIPTION FIELD (2byte) | 0x0006 |
| 3105 | eid DESCRIPTION FIELD (2byte) | 0x7890 |
| 3106 | PHONE NUMBER LENGTH DESCRIPTION FIELD (1byte) | 0x09 |
| 3107 | RECEIVING DEVICE PHONE NUMBER DESCRIPTION FIELD (VARIABLE LENGTH) | "066012345" |

FIG. 31

| | | |
|---|---|---|
| 2401 | NOTIFICATION TAG FIELD (1byte/0x04) | 0x04 |
| 2402 | nid DESCRIPTION FIELD (2byte) | 0x1234 |
| 2403 | tid DESCRIPTION FIELD (2byte) | 0x0005 |
| 2404 | sid DESCRIPTION FIELD (2byte) | 0x0006 |
| 2405 | eid DESCRIPTION FIELD (2byte) | 0x7890 |
| 2406 | MEMBERSHIP NUMBER FIELD (4byte) | 1000 |

| | | |
|---|---|---|
| 3201 | NOTIFICATION TAG FIELD(1byte/0x06) | 0x06 |
| 3202 | nid DESCRIPTION FIELD(2byte) | 0x1234 |
| 3203 | tid DESCRIPTION FIELD(2byte) | 0x0005 |
| 3204 | sid DESCRIPTION FIELD(2byte) | 0x0006 |
| 3205 | eid DESCRIPTION FIELD(2byte) | 0x7890 |
| 3206 | MEMBERSHIP NUMBER FIELD(4byte) | 1000 |
| 3207 | PHONE NUMBER LENGTH DESCRIPTION FIELD(1byte) | 0x09 |
| 3208 | RECEIVING DEVICE PHONE NUMBER DESCRIPTION FIELD(VARIABLE LENGTH) | "066012345" |

FIG. 38

| NOTIFICATION TAG FIELD (1byte/0x00) | 0x00 |
| --- | --- |
| nid DESCRIPTION FIELD (2byte) | 0x1234 |
| tid DESCRIPTION FIELD (2byte) | 0x0005 |
| sid DESCRIPTION FIELD (2byte) | 0x0006 |
| eid DESCRIPTION FIELD (2byte) | 0x7890 |
| MJD FORMAT BROADCAST STARTING TIME (5byte) | 0xC8631234 56(99 5/1 12:34:56) |

DIGITAL BROADCAST SYSTEM AND ITS COMPONENT DEVICES THAT PROVIDE SERVICES IN ACCORDANCE WITH A BROADCAST WATCHED BY VIEWERS

This application is based on application No. 11-142844 filed in Japan, the content of which is hereby incorporated by reference.

BACKGROUND OF THE INVENTION (1) Field of the Invention

The present invention relates to a digital broadcast system and more specifically to a system that provides predetermined services to viewers in accordance with certain broadcasts watched by the viewers.

(2) Description of the Prior Art

Developments in the semiconductor and digital communication technologies have enabled the realization of digital satellite broadcasting. Non-satellite broadcasting via wired or wireless communication is also progressing.

Digital broadcasting allows various types of data, in addition to images and audio data, to be sent to viewers. For instance, scripts that control displays of user-selectable alternatives relating to program content and prompts for viewer selections can be broadcasted with programs to allow user interaction.

Also, with digital broadcasting, viewer management, such as that used for PPV (Pay Per View) services that selectively distribute programs to certain viewers, can be easily and precisely performed. In such services, the host station broadcasts a PPV program which has been encrypted (scrambled), and only viewers who have paid the fee are allowed to set the key information for decrypting (descrambling) in their digital broadcast receiving devices to watch the fee-based program. In most cases, the viewer will order a fee-based program he wishes to watch before the program is broadcasted, and will receive data on which the key information is based from the broadcaster via a telephone line.

This type of conventional digital broadcasting technology is disclosed by Japanese Laid-Open Patent Applications No.8-125624 and No.8-56348.

Patent Application No.8-125624 discloses a technology to compress information relating to phone numbers to which the viewer should send his reply, multiplex it into a broadcast signal, and send the broadcast signal. The viewer can easily participate in an interactive program using a cellular phone that makes replies in accordance with the sent information.

Patent Application No.8-56348 discloses a device into which functions of a remote-control of a digital broadcast receiving device and a cellular phone are integrated. This device makes it easy for the viewer to receive and set information for the descrambling, such as a key.

These conventional technologies can provide viewers with a variety of digital broadcasting services, such as for PPV and interactive programs, and only require the viewer to perform relatively simple operations.

Currently, all kinds of programs are digitally broadcasted using many channels. Like ordinary TV channels, different programs are broadcasted at different times on each channel.

As things stand, users have to perform complex operations to inform the broadcaster of the fee-based program they want to watch. For instance, when a viewer who is watching a program at no charge wishes to watch a scrambled fee-based program that follows the free program on the same channel, the viewer has to search through a vast amount of information for numerous programs to find the channel number, the broadcast starting time, or the code number which specifies the fee-based program, before sending the information to the broadcaster via a cellular phone.

It is very common for users to record programs onto a recording medium to allow later viewing. If the broadcaster uses the same phone numbers for programs broadcasted at different times and viewers do not specify which program they are viewing, confusion may arise when viewers of recorded programs call a phone number that is currently being used for a different program.

SUMMARY OF THE INVENTION

In view of the above problems, the first object of the present invention is to provide a digital broadcast system that can provide viewers with appropriate services for a digital broadcast without viewers needing to perform complex operations.

Since portable phones, which include cellular phones, and portable electronic data appliances are in widespread use, the present invention aims, as the second object, to provide services appropriate for a digital broadcast to viewers in possession of a portable communication device, such as a portable phone, without the user having to use any particular digital broadcast receiving device to receive the digital broadcast.

In order to achieve the above objects, the digital broadcast system of the present invention includes: a receiving unit for receiving a digital broadcast of a program; presenting unit for presenting the program received by the receiving unit to a viewer; a program-device information sending unit for sending program ID (identification) information that specifies either the presented program or a program related to the presented program, and sending device ID information that specifies a device related to the presenting unit; and a service processing unit for receiving the program ID information and the device ID information from the program-device information sending unit, and providing a service for the program specified by the program ID information to the viewer of the presented program, based on the device ID information.

With this construction, when a viewer receives and and watches a digitally broadcasted program, the service processing unit such as in a host station can specify either the program watched by the viewer, or another program advertised by the program. This allows the service processing unit to provide a service appropriate for the specified program without the viewer needing to perform complex operations. At the same time, the service processing unit can specify a device related to reproduction of the specified program, such as a receiving device that has reproduced the program or a portable phone carried by the viewer watching the reproduced program. As a result, the service processing unit can provide a service to the device that has been specified in this way.

Here, the program-device information sending unit may include: a program ID information sending unit for sending the program ID information that specifies the presented program; and a communication device for receiving the program ID information from the program ID information sending unit, and sending information that specifies the communication device as the device ID information to the service processing unit together with the received program ID information.

With this construction, the program ID information sending unit such as in a digital broadcast receiving device sends program ID information, which specifies a program watched by a viewer, to a communication device such as a portable phone carried by the viewer. The communication device then sends this information together with information that specifies the communication device itself to the service processing unit, which may be located in the host station. As a result, the service processing unit can provide an appropriate service for the program watched by the viewer to the communication device.

Here, the communication device may include: a target phone number storage unit for storing a phone number of the service processing unit; and a transmission unit for telephoning the stored phone number and sending the program ID information and the device ID information to the service processing unit.

With this construction, the communication device can reliably and quickly send the information via a telephone line to the service processing unit.

Here, the communication device may include an own phone number storage unit for storing a phone number of the communication device, and the device ID information may be the phone number stored by the own phone number storage unit.

For this construction, a phone number of each communication device is used as the device ID information specifying the communication device. As a result, the service processing unit can provide a service corresponding to each communication device, and easily offer a service such as providing information to the viewer by phoning the phone number.

Here, the communication device may be a portable phone, and the program ID information sending unit may send the program ID information by transmitting either an IR (infrared) signal or a radio wave whose output is 1.0 mW or lower.

For this construction, a receiving device capable of reproducing a digital broadcast sends program ID information by transmitting an IR signal or a radio wave whose output is 1.0 mW or less. As a result, the program ID information is transferred to phones, such as portable phones carried by each viewer, in the periphery of the receiving device, which allows the service processing unit to provide a variety of services corresponding to each viewer such as sending information to a portable phone of each viewer.

Here, the service processing unit may provide the service by: (1) telephoning the phone number that has been sent by the transmission unit; and (2) sending predetermined information corresponding to the received program ID information.

This construction makes it possible to provide services via a telephone line to each viewer, such as a service that sends information corresponding to a program watched by each viewer. For instance, this information can be information showing whether the viewer's answer to a quiz question in the program is correct, or information used to descramble the program watched by the viewer.

Here, control instructing information may be multiplexed with the program received by the receiving unit, and on detecting the control instructing information, the program ID information sending unit may send the program ID information.

By multiplexing the control instructing information together with a certain program into a digital broadcast and broadcasting this digital broadcast, the service processing unit can provide a predetermined service only when a viewer watches this program. When the control instructing information and a program offering a prize are multiplexed into a digital broadcast, for instance, the present digital broadcast system can automatically enter viewers of the program into a prize draw.

Here, the program ID information may be additionally multiplexed with the received program, and the program ID information sending unit may send the program ID information that has been received by the receiving unit.

With this construction, a receiving device for a digital broadcast can receive program ID information along with a program and send this program ID information to the communication device without providing the receiving device with a special function to obtain program ID information, besides a function to receive a digital broadcast.

Here, the program ID information may be information that can specify the program within a predetermined period and that is defined in the *Digital Video Broadcasting (DVB); Specification for Service Information (SI) in DVB Systems*, the information being either a combination of: (a) Network_id; (b) Transport Stream_id; (c) Service_id; and (d) Event_id, or a combination of: (a) Bouquet_id; (b) Service_id; and (c) Event_id.

For this construction, a receiving device for a digital broadcast receives information defined in the Digital Video Broadcasting (DVB); Specification for Service Information in DVB Systems, and can send it as the program ID information that specifies the reproduced program.

Here, the service processing unit may provide the service by referring to the program ID information sent by the communication device to specify the program and by sending descrambling information used to descramble the program to the communication device, and the communication device may send the descrambling information, which has been sent by the service processing unit, to the presenting unit by transmitting either an IR signal or a radio wave whose output is 1.0 mW or lower. The presenting unit may descramble the program by using the descrambling information while presenting the program.

With this construction, the service processing unit such as in the host station can provide a service of sending descrambling information to descramble a program watched by a viewer to his portable phone. The portable phone then sends the descrambling information to the reproducing unit such as in a receiving device for a digital broadcast. Accordingly, viewers can descramble and watch a program that has been scrambled.

Here, the program ID information may also include information showing a broadcast starting time for the program.

As a result, the program ID information can specify a program even when a predetermined period has passed since the program was broadcasted. As a result, even when the viewer watches a program that was broadcasted and recorded relatively long time ago, the service processing unit can specify the program and provide a service appropriate for the specified program.

Here, the transmission unit may also send playback time information showing a time at which the presenting unit presented the program, and the service processing unit may provide the service based on the sent playback time information.

This construction allows the service processing unit to provide a service based on not only the program ID information but also a time at which the program was reproduced. As a result, the service processing unit can provide a different service for the same program according to, for instance, whether the program is reproduced either while being received or after having been recorded.

Here, the communication device may further include a user operation receiving unit for receiving a user operation, and if the user operation receiving unit has received a predetermined user operation, the transmission unit may send the program ID information and the device ID information.

With this construction, on receiving an operation from a viewer, a portable phone carried by a viewer sends information to the service processing unit. This enables the service processing unit to provide a service only when desired by a viewer.

Here, if the user operation receiving unit has received a user operation involving a data input, the transmission unit may send the inputted data in addition to the program ID information and the device ID information.

With this construction, the service processing unit can provide a service to a viewer in accordance with data that has been inputted by the viewer.

Here, together with the program ID information, the program-device information sending unit may send a phone number of the device including the presenting unit as the device ID information to the service processing unit. If the device has received information to descramble the program, the presenting unit may descramble the program using the information while presenting the program. The service processing unit may provide the service by: (1) referring to the program ID information to specify the program; (2) telephoning the phone number; and (3) sending the information to descramble the specified program to the device.

For this construction, the service processing unit can provide a service of sending information used to descramble a program to a device such as a digital broadcast receiving device, without the viewer needing to perform complex operations.

Here, the program-device information sending unit may include: an information sending unit for sending the program ID information that specifies the presented program, and the phone number by transmitting either an IR signal or a radio wave whose output is 1.0 mW or less; and a portable phone that receives the program ID information and the phone number from the information sending unit and that sends user ID information, which is stored in the portable phone and specifies a user of the portable phone, to the service processing unit together with the program ID information and the phone number. The service processing unit may store at least one combination of: (a) order ID information specifying a viewer who has ordered a program; and (b) ordered-program ID information specifying the program ordered by the viewer, and may provide the service when storing a combination that matches the user ID information and the program ID information that have been sent by the portable phone.

For this construction, if a viewer has already ordered a certain program, it is possible to provide a service of sending information used to descramble the certain program to a device for reproducing a program, such as a receiving device, with which the viewer watches the program. This service does not require the viewer to perform complex operations. In this way, as long as a viewer has ordered a program in advance, he can descramble and watch the program using any receiving device.

Here, control instructing information may be multiplexed with the program received by the receiving unit, and if the receiving unit has received the control instructing information, the program-device information sending unit may send a phone number of the device that includes the receiving unit as the device ID information together with the program ID information to the service processing unit.

By broadcasting a digital broadcast, into which the control instructing information has been multiplexed together with a certain program, the service processing unit can provide a service appropriate for this certain program only if a viewer watches this program.

Here, the program presented by the presenting unit may be a commercial advertising another program. The program-device information sending unit may include: a program ID information sending unit for sending the program ID information, which specifies the advertised program; and a communication device for receiving the program ID information from the program ID information sending unit, and sending a phone number of the communication device as the device ID information together with the received program ID information to the service processing unit when receiving a predetermined operation from the viewer. The service processing unit may provide the service by telephoning the sent phone number to inform the viewer of a broadcast starting time for the program specified by the program ID information.

With this construction, if the viewer, who is watching a commercial advertising a program, has performed a predetermined operation, which shows that he is to watch the advertised program, on his communication device such as a portable phone, the service processing unit such as in a host station can provide a service of notifying the communication device that a broadcast starting time for the program has come to prevent the viewer from missing the program.

The above objects can be also achieved by a receiving device that receives a digital broadcast, including: a receiving unit for receiving a digital broadcast of a program; a presenting unit for presenting the received program to a viewer; and a program-device information sending unit for sending program ID information that specifies either the presented program or a program related to the presented program by transmitting either an IR signal or a radio wave whose output is 1.0 mW or less.

With this construction, a receiving device which receives and reproduces a digital broadcast can send, to a device capable of receiving an IR signal, program ID information specifying a second program related to a first program which the receiving device currently reproduces. This is to say, if the viewer carrying a device such as a portable phone is close enough to watch a program on the receiving device and this portable phone has a function to receive program ID information via an IR signal from the receiving device and to send the received program ID information together with other necessary information to a host station, then the service processing unit such as in a host station can provide a service appropriate for the first program currently watched by the viewer without the viewer needing to perform complex operations.

Here, if control instructing information is additionally multiplexed into the digital broadcast, the receiving unit may also receive the control instructing information. If the receiving unit has received the control instructing information, the program-device information sending unit may send the program ID information.

With this construction, a receiving device, which receives and reproduces a digital broadcast, can send program ID information for a program, which has been broadcasted together with control instructing information, via an IR signal to a device such as a portable phone of a viewer. If the viewer's potable phone has a function to receive program ID information via an IR signal from the receiving device and to send the program ID information together with other necessary information to a host station, the service processing unit such as in a host station can provide a service appropriate for the program to the viewer without the viewer needing to perform complex operations.

The above objects can be also achieved by a communication device that receives program ID information specifying a program that has been digitally broadcasted, and sends the received program ID information to a predetermined destination, the communication device including: a storage unit for storing a phone number of the communication device; a receiving unit for receiving the program ID information, which has been sent by a receiving device by transmitting either an IR signal or a radio wave whose output is 1.0 mW or less, wherein the receiving device has received a digital broadcast of the program; and a sending unit for sending the received program ID information and the phone number to the predetermined destination via a telephone line.

With the above construction, the communication device receives program ID information specifying a program reproduced by a digital broadcast receiving device from the receiving device, and sends the program ID information together with a phone number of the communication device itself to a predetermined destination. When the predetermined destination is a host station, for instance, the host station can specify the reproduced program based on the sent program ID information and provide a service such as sending information to the communication device by telephoning the sent phone number.

Here, the communication device may further include user an operation receiving unit for receiving a user operation, wherein if the user operation receiving unit has received a predetermined user operation, the sending unit may send the program ID information and the phone number to the predetermined destination.

With this construction, a predetermined destination such as a system can obtain information reflecting a viewer's wish and therefore can provide a service in accordance with the viewer's wish.

Here, if the user operation receiving unit has received a user operation involving a data input, the sending unit may send the inputted data in addition to the program ID information and the phone number.

On receiving program ID information and data inputted by the viewer, the predetermined destination such as a system can provide a service in accordance with a program watched by a viewer and the information inputted by the viewer. For instance, if a viewer has sent an answer to a quiz question in a quiz show while watching the show, the system can notify the viewer whether his answer is correct.

Here, the communication device may have a function to remote-control the receiving device.

With this construction, a communication device of a viewer such as a portable phone that functions both as a remote control of a receiving device capable of receiving and reproducing a digital broadcast and as a portable phone to send information for a program watched by the viewer via a telephone line to a service provider that provides services appropriate for the program such as a host station. This allows the communication device to receive, for instance, descrambling information via a telephone line from the host station and to transfer it to the receiving device, which then descrambles and reproduces the program using the descrambling information.

The above objects can be also achieved by a service providing device that provides a service for a program that has been digitally broadcasted, including: a receiving unit for receiving via a telephone line, program ID information that specifies a program being watched by a viewer using a device, and a phone number of the device; and a service processing unit for: (1) specifying information that should be sent, based on the received program ID information; (2) telephoning the received phone number; and (3) sending the specified information to the device.

With this construction, the service providing device can send information to a viewer's device such as a portable phone in accordance with a program watched by the viewer.

Here, the receiving unit may also receive viewer ID information that specifies the viewer via the telephone line, and the service processing unit may stores at least one combination of: (a) order ID information that specifies a viewer who has ordered a program; and (b) ordered-program ID information that specifies the program ordered by the viewer, and may specify, when storing a combination that matches the viewer ID information and the program ID information that have been received by the receiving unit, information used to descramble the program specified by the program ID information as the information that should be sent.

With this construction, on receiving viewer ID information, which specifies a viewer, from a device of the viewer such as a portable phone, the service providing device sends, if the viewer ID information shows a viewer whom the service providing device has already registered, information used to descramble a program that has been ordered by the viewer by telephoning the phone number of the viewer's device. When this service providing device is used with: (a) a receiving device capable of receiving and reproducing a digitally broadcasted program and sending program ID information specifying the reproduced program; and (b) a device, such as a portable phone, capable of receiving the program ID information from the receiving device and sending it together with other information such as viewer ID information to the service providing device, the service providing device can send, if the viewer has already ordered a program by paying for it and the service providing device has already registered his order for the program, descrambling information for the program to the receiving device and/or the portable phone which are currently used by the viewer to watch the program as soon as the viewer has watched the program that is scrambled.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 is example data contents and construction of phone numbers of the operating device 203 and a host station 206 which are stored in a data memory unit 411 in the operating device 203;

FIG. 10 shows example data construction and contents of the first transmission data used by the receiving device 202 to send the program ID information;

FIG. 11 shows example data construction and contents of the second transmission data sent from the operating device 203 to the host station 206;

FIG. 24 shows example construction and contents of the second transmission data generated by the operating device in step S2104;

FIG. 28 shows an example construction and contents of transmission data, which the receiving device generates and sends to the operating device while receiving a commercial broadcast that advertises a fee-based program;

FIG. 29 shows example contents and construction of transmission data, which the receiving device generates and sends to the operating device while receiving a fee-based program;

FIG. 31 shows example contents and construction of the third transmission data, which the operating device sends to the host station while a commercial for a fee-based program is being broadcasted;

FIG. 38 shows example contents and construction of transmission data that contains the program ID information containing the broadcast starting time information and which the receiving device sends, instead of the first transmission data shown in FIG. 10, to the operating device.

DESCRIPTION OF THE PREFERRED EMBODIMENTS

The following describes several embodiments for the present invention with reference to drawings.

First Embodiment

The following explains a digital broadcast system according to the first embodiment of the present invention.

Digital Broadcast System Overview

Figure 1:
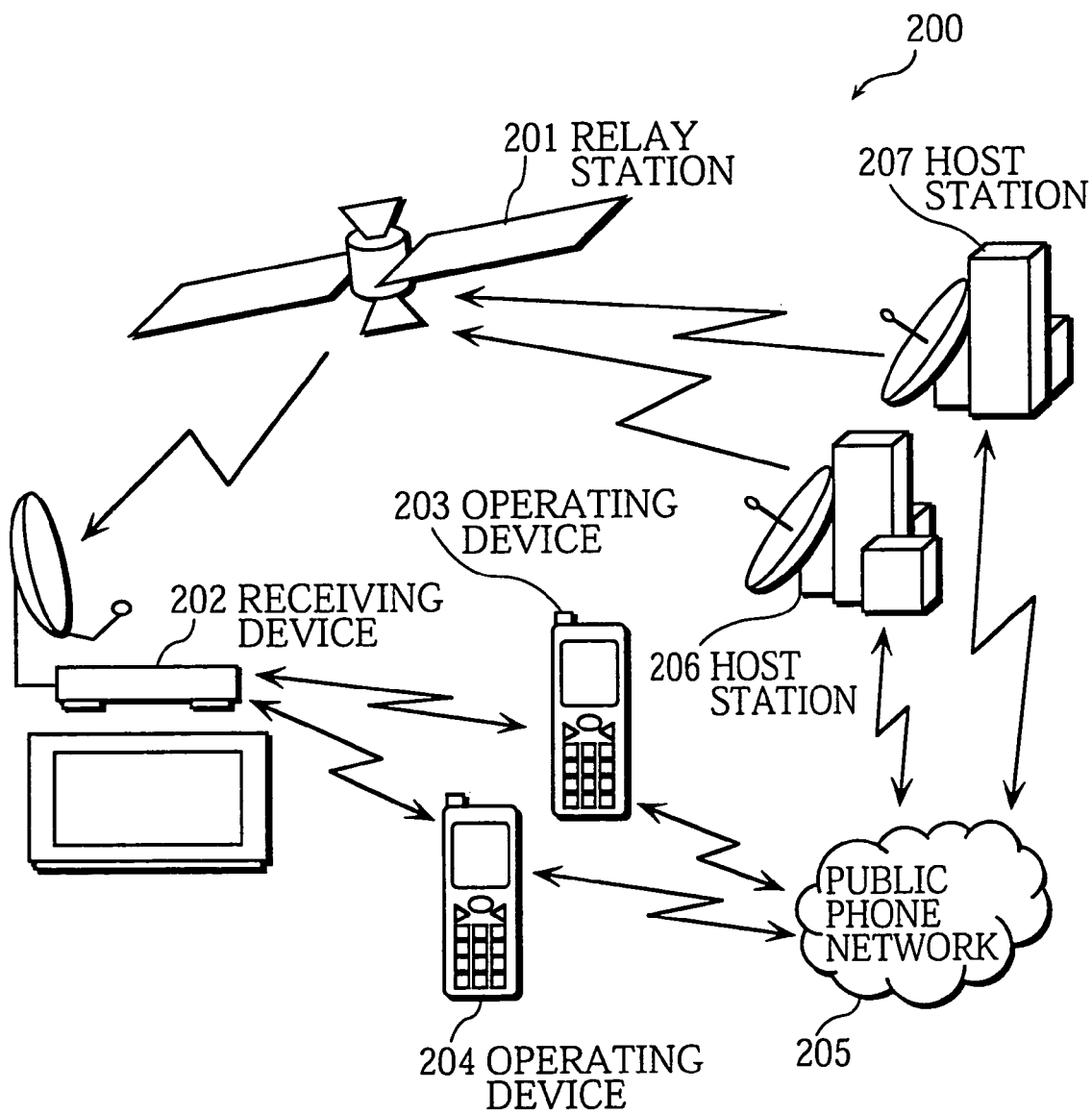
FIG. 1 is a diagram showing a construction of a digital broadcast system 200 according to the first embodiment of the present invention.

FIG. 1 is a diagram showing a construction of a digital broadcast system 200 of the present embodiment.

In the present digital broadcast system 200, a host station broadcasts a digital program offering prizes to an audience, and the audience can automatically apply for the prizes. The digital broadcast system 200 comprises host stations 206–207, a relay station 201, a receiving device 202, operating devices 203–204, and a public phone network 205.

The host stations 206–207 transmit digital broadcast waves. In addition to a program itself, that is, the content of the program, the host stations 206–207 broadcast program-related information such as broadcast starting times and channel numbers to be used to display an Electric Program Guide (EPG), in a similar way to an ordinary host station that broadcasts a digital satellite program. Generally, a program to be broadcasted has a format according to the Digital Video Broadcasting (DVB); Specification for Service Information (SI) in DVB Systems with a standard number "EN 300 468", which is standardized by European Broadcasting Union. This standard is often called "DVB-SI" or "SI information". As a standard based on the DVD-SI to be used in Japan, ARIB STD B-10 (Association of Radio Industries and Businesses Standard) is also available. The host stations 206–207 send a program using ordinary transport streams according to Moving Picture Experts Group 2 (MPEG-2) standardized by ISO/IEC (International Electrotechnical Commission) 13818, and send the program-related information according to the DVB-SI.

The relay station 201 passes on a broadcast wave from the host stations 206–207 to the receiving device 202.

The receiving device 202 can be achieved by a set top box, or the like, which receives a digital broadcast. This device 202 is connected to a receiving antenna and a TV monitor.

The operating devices 203–204 are identical devices that both function as a cellular phone and a remote control of the receiving device 202. These devices 203–204 can be provided separately to individual users, and allow users to make user operations.

The following is a brief explanation of the processing of the digital broadcast system 200.

The host stations 206–207 multiplex and broadcast a program and information such as the program-related information, which the relay station 201 transfers to the receiving device 202. The receiving device 202 receives a program in accordance with an instruction given by the viewer via the operating device 203/204, and obtains program identification (ID) information that specifies the program being watched by the viewer, by referring to the broadcasted program-related information. The receiving device 202 then sends the obtained program ID information to the operating device 203/204 via an infrared (IR) signal.

The operating devices 203–204 send their respective phone numbers and the program ID information that they have received to the host station 206/207 via the public phone network 205.

On receiving the information sent by the operating devices 203–204, the host stations 206–207 analyze the information and provide predetermined services to the viewers. These predetermined services will be described later as part of the detailed description of the operation of the digital broadcast system 200.

Construction of Digital Broadcast System 200

<Receiving Device 202 Construction>

The following describes the receiving device 202 in the digital broadcast system 200.

Figure 2:
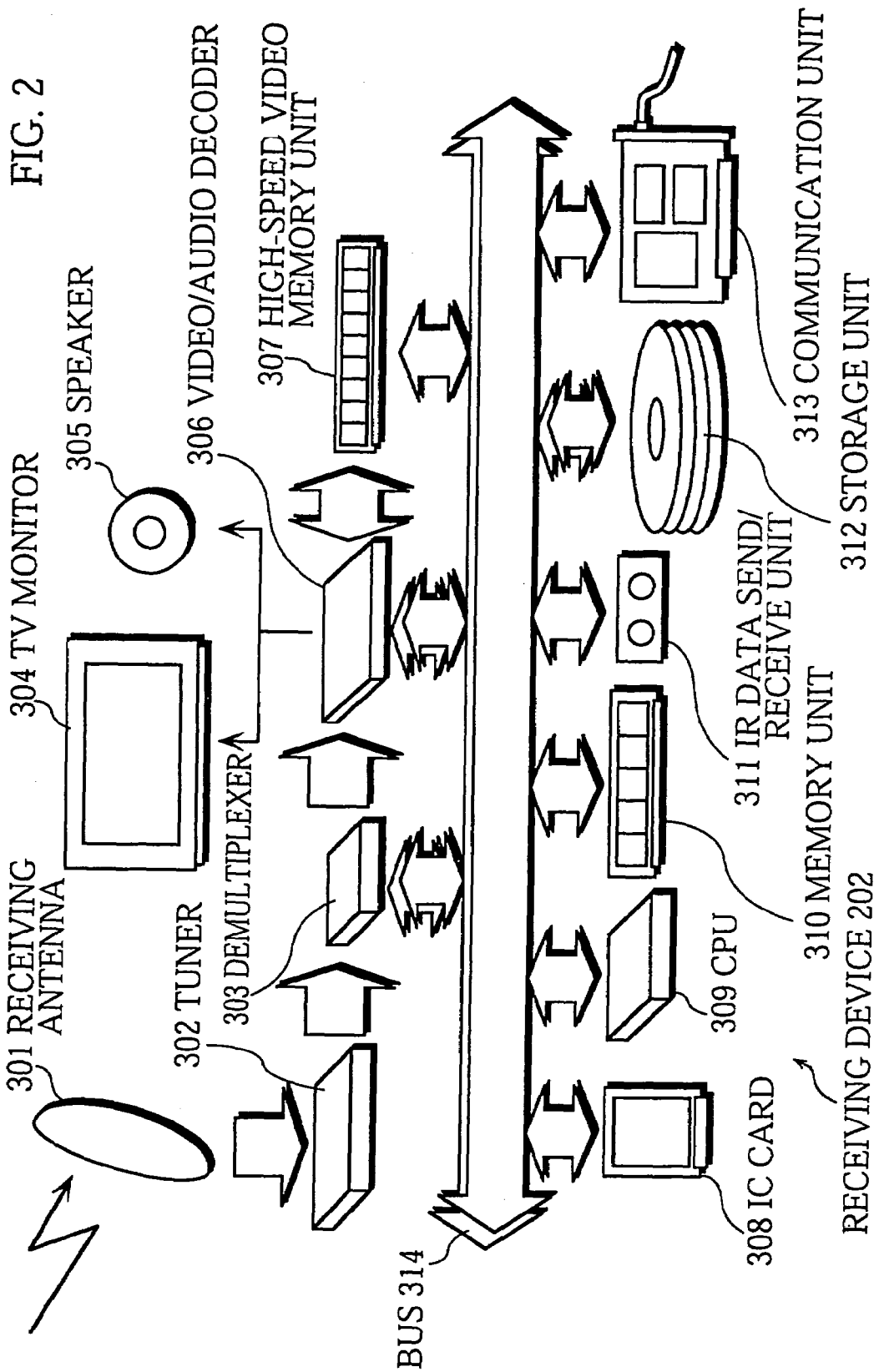
FIG. 2 shows a hardware construction of a receiving device 202.

FIG. 2 shows a hardware construction of the receiving device 202 that includes the following: a receiving antenna 301; a tuner 302; a demultiplexer 303; a TV monitor 304; a speaker 305; a video/audio decoder 306; a high-speed video memory unit 307; an IC card 308; a CPU 309; a memory unit 310; an IR data send/receive unit 311; a storage unit 312; a communication unit 313; and a bus 314.

The tuner 302 receives a modulated broadcast wave via the receiving antenna 301 from the host station 206/207, and obtains a digital stream from the modulated broadcast wave. For instance, the tuner 302 obtains an MPEG-2 transport stream, into which data for a plurality of channels has been multiplexed to broadcast the data using a single band.

The demultiplexer 303 receives a transport stream from the tuner 302 and separates the transport stream into digital video information, digital audio information, and data information. This data information includes the program-related information that has been sent with a program.

The video/audio decoder 306 decompresses the digital video information and the digital audio information that have been compressed according to MPEG, for instance, into original uncompressed forms, and outputs them as image signals and audio signals. This results in video images being displayed by the TV monitor 304 and sound being outputted by the speaker 305. The video/audio decoder 306 uses the high-speed video memory unit 307 for the above decompression. The video/audio decoder 306 also has a function for using key information sent by the CPU 309 to descramble digital video information and digital audio information that have been scrambled.

The communication unit 313 is connected to the public phone network 205 and transfers data to and from the periphery.

The IC card 308 is provided with flash memory that can store key information used for the descrambling. When receiving the key information that has been encrypted, the IC card 308 decrypts the key information and places it into the flash memory.

The IR data send/receive unit 311 receives an IR signal that shows a viewer operation from the operating device 203/204, and sends data showing the viewer operation to the CPU 309. The viewer operation gives an instruction to the receiving device 202, such as to receive and reproduce a program, to receive and record a program, or to reproduce a program that it has recorded. The IR data send/receive unit 311 also sends data, which has been sent from the CPU 309, to the periphery via an IR signal. For instance, the IR data send/receive unit 311 sends the program ID information to the operating device 203/204. Note that to "reproduce a program" means to generate signals to display a program in a form that the viewer can watch.

The CPU 309 controls other units in the receiving device 202 by executing a control program stored in the memory unit 310, and also controls a reproduction of a program based on the data information that has been sent to the memory unit 310.

In more detail, if the viewer operation is for standard reproduction, the CPU 309 instructs the demultiplexer 303 to directly send the separated digital video information and digital audio information to the video/audio decoder 306 and to send the data information to the memory unit 310. On the other hand, if the viewer's operation instructs to record a program, the CPU 309 instructs the demultiplexer 303 to send all the separated information to the storage unit 312. When a recorded program needs to be reproduced, the CPU 309 reads stored information from the storage unit 312, sends the read digital video information and digital audio information to the video/audio decoder 306, and sends the read data information to the memory unit 310.

When a scrambled program is received and reproduced, the CPU 309 transfers the key information for the descrambling from the IC card 308 to the video/audio decoder 306. When the communication unit 313 has received encrypted key information from the host station 206/207, the CPU 309 transfers it from the communication unit 313 to the IC card 308.

<Construction of Operating Devices 203–204>

The following describes the operating devices 203–204 in the digital broadcast system 200.

Figure 3:
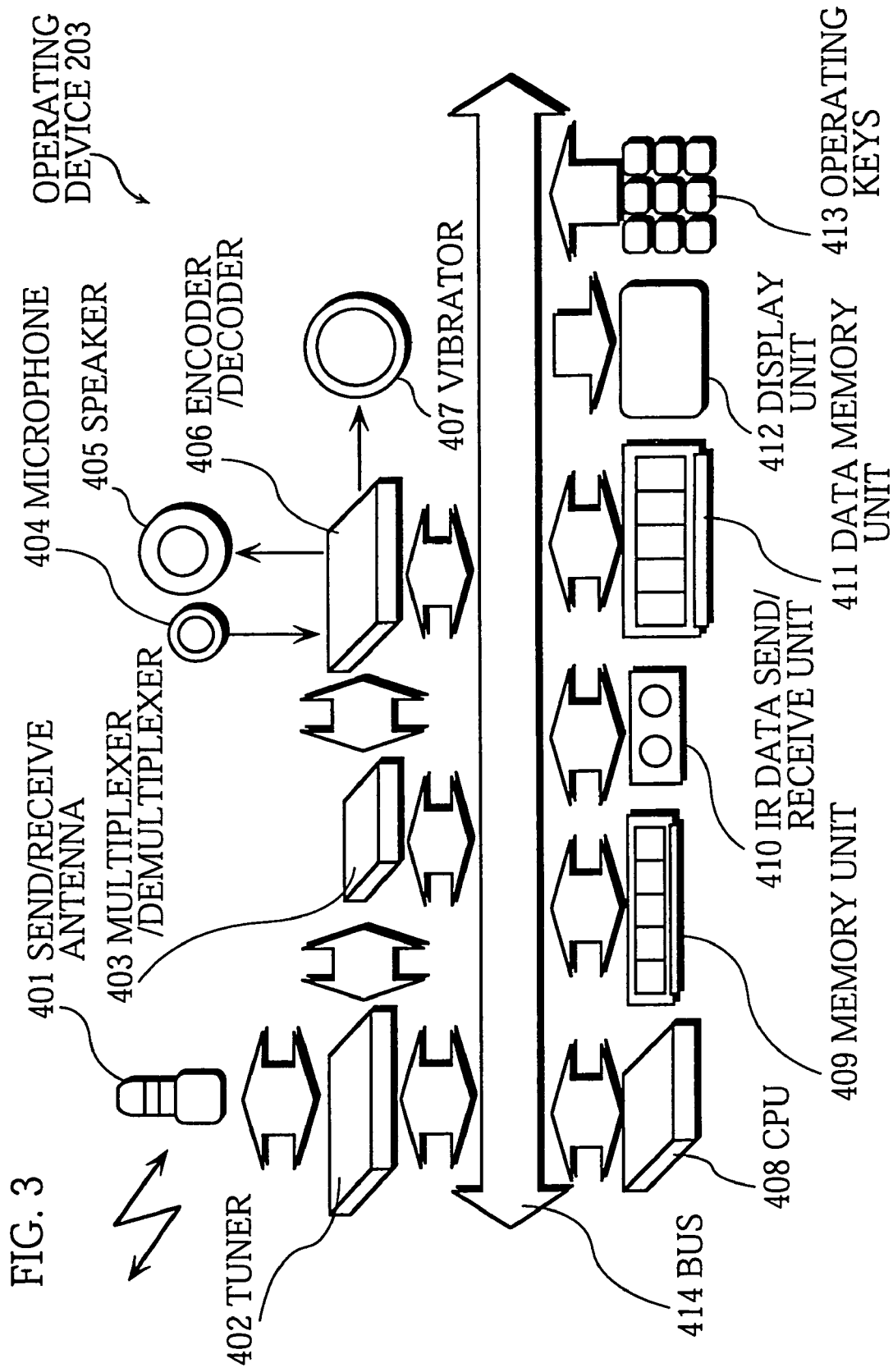
FIG. 3 shows a hardware construction of an operating device 203.

FIG. 3 shows a hardware construction of the operating device 203, which includes the following elements: a send/receive antenna 401; a tuner 402; a multiplexer/demultiplexer 403; a microphone 404; a speaker 405; an encoder/decoder 406; a vibrator 407; a CPU 408; a memory unit 409; an IR data send/receive unit 410; a data memory unit 411; a display unit 412; operating keys 413; and a bus 414.

When the operating device 203 sends data, the tuner 402 modulates data which has been sent from a multiplexer circuit in the multiplexer/demultiplexer 403, and sends the modulated data via the send/receive antenna 401 to a cellular phone network. On the other hand, when the operating device 203 receives data via the send/receive antenna 401 from the cellular phone network, the tuner 402 demodulates the received data and sends it to a demultiplexer circuit in the multiplexer/demultiplexer 403.

As described above, the multiplexer/demultiplexer 403 has a multiplexer circuit and a demultiplexer circuit. The multiplexer circuit reads the data information from the memory unit 409 or the data memory unit 411, multiplexes the read data information together with the digital audio information that has been encoded by an encoder circuit in the encoder/decoder 406, and sends it to the tuner 402. The demultiplexer circuit receives data that has been demodulated and sent by the tuner 402, and separates the received data into data information and digital audio information which were multiplexed into the data. After this, the demultiplexer circuit writes the separated data information into the memory unit 409 or the data memory unit 411 and sends the separated digital audio information to a decoder circuit in the encoder/decoder 406.

The operating keys 413 are an input unit that functions as both a numeric keypad, as in a standard cellular phone, and keys that control the processing of the receiving device 202. On receiving an operation of a viewer, who is the user of the operating device 203, the operating keys 413 send the operation contents to the CPU 408.

The display unit 412 is a liquid crystal panel or the like that displays text under the control of the CPU 408.

The data memory unit 411 is non-volatile memory and stores phone numbers of the operating device 203 and the host station 206/207.

FIG. 4 shows an example data construction and contents of the phone numbers stored in the data memory unit 411.

The IR data send/receive unit 410 transfers data to/from the receiving device 202. When receiving data as an IR signal from the receiving device 202, the IR data send/receive unit 410 sends the received data to the CPU 408. When receiving data that shows user's operation contents from the CPU 408, the IR data send/receive unit 410 sends the data as an IR signal to the receiving device 202.

The encoder/decoder 406 has the encoder circuit that encodes an audio signal that has been inputted from the microphone 404, and the decoder circuit that decodes data that has been encoded to obtain an audio signal and outputs the audio signal to the speaker 405.

The vibrator 407 vibrates under the control of the CPU 408 to notify the user of an incoming call.

The CPU 408 controls other units in the operating device 203 by executing the control program in the memory unit 409, and transfers data showing user's operation contents, which has been inputted via the operating keys 413, to the IR data send/receive unit 410. The CPU 408 controls other units to perform the following operations: (1) an operation similar to that performed by an ordinary cellular phone such as controlling other units to call a predetermined phone number; (2) an operation similar to that performed by an ordinary remote control; and (3) an operation unique to the present invention.

The operating device 204 has the same construction as the operating device 203.

<Constructions of Host Stations 206–207>

The following describes the host stations 206–207 in the digital broadcast system 200.

Figure 5:
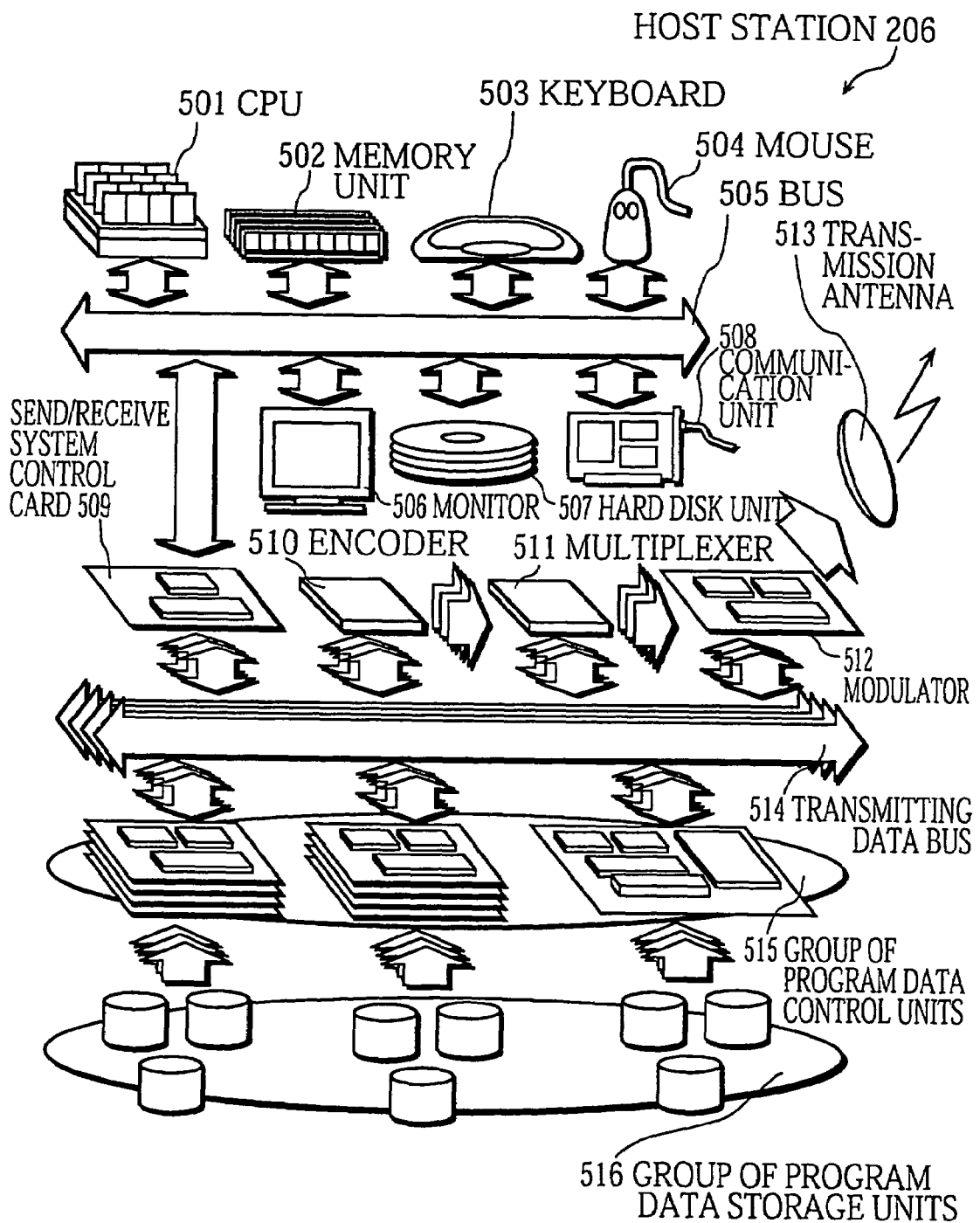
FIG. 5 shows a hardware construction of the host station 206.

FIG. 5 shows a hardware construction of the host station 206.

The host station 206 is a system for broadcasting programs and comprises the following units as shown in the figure: a CPU 501; a memory unit 502; a keyboard 503; a mouse 504; a bus 505; a monitor 506; a hard disk unit 507; a communication unit 508; a send/receive system control card 509; an encoder 510; a multiplexer 511; a modulator 512; a transmission antenna 513; a transmitting data bus 514; a group of program data control units 515; and a group of program data storage units 516.

The bus 505 is connected to the following elements: the CPU 501; the memory unit 502; the keyboard 503; the mouse 504; the monitor 506; the hard disk unit 507; the communication unit 508; and the send/receive system control card 509. The transmitting data bus 514 is connected to the following elements: the send/receive system control card 509; the encoder 510; the multiplexer 511; the modulator 512; and the group of program data control units 515.

The group of program data storage units 516 is a group of hard disk units or the like, and stores a plurality of programs (data of content of the programs) and the program-related information that contains information to specify each program and condition information showing conditions to watch the program.

The group of program data control units 515 reads programs and information such as the program-related information onto the transmission data bus 514.

The CPU 501 controls operations of circuits connected to the bus 505 by executing a control program stored in the memory unit 502. In more detail, the CPU 501 receives data showing the program ID information and the phone number of the operating device 203/204 via the public phone network 205 from the operating device 203/204. The CPU 501 then analyzes the received data and controls the processing to provide a predetermined service to the viewer. The CPU 501 also instructs the send/receive system control card 509 which programs should be broadcasted based on a predetermined broadcast schedule.

The communication unit 508 is connected to the public phone network 205 and sends data to and receives data from external devices such as the operating devices 203–204. More specifically, the communication unit 508 receives data showing the program ID information and the phone number of the operating device 203/204, and sends the received data to the CPU 501. When receiving the key information for the descrambling which has been encrypted from the CPU 501, the communication unit 508 sends it to the receiving device 202. This key information is sent by the CPU 501 in response to an operator's instruction that is given after the host station 206 has received a request for the key information and a fee for the program from the viewer. It is alternatively possible for the CPU 501 to directly send the key information to the communication unit 508 without waiting for the operator's instruction, which will be described later.

The monitor 506 displays text or the like for the operator at the host station 206 under the control of the CPU 501. The keyboard 503 and the mouse 504 are input devices for receiving an operator's operation and sending it to the CPU 501.

The send/receive system control card 509 controls operations of different types of circuits that are involved in the broadcasting of a program. In more detail, the send/receive system control card 509 controls the group of program data control units 515 to have it read programs and information such as the program-related information that corresponds to an instruction from the CPU 501, and transfers the read programs and information to the encoder 510.

On receiving programs and the information from the send/receive system control card 509, the encoder 510 converts them into the MPEG-PES (Packetized Elementary Stream) packet format and sends it to the multiplexer 511.

The multiplexer 511 multiplexes the data in the MPEG-PES packet format and sends it to the modulator 512.

The modulator 512 receives the data in which programs and the information are multiplexed from the multiplexer 511, converts the data to electric signals, and sends it to the transmission antenna 513.

The transmission antenna 513 converts electric signals that has been sent from the modulator 512 into radio wave signals, and transmits the radio wave signals.

The host station 207 has the same construction as the above host station 206.

Data Constructions

<Program-Related Information to be Broadcast by Host Station 206/207>

The following describes the program-related information which the host station 206 broadcasts.

According to the DVB-SI, each program is identified by a combination of the following identifiers: Network_id (nid) showing a network to broadcast the program; Transport Stream_id (tid) showing a physical channel for the program; Service_id (sid) showing a logical channel for the program; and Event_id (eid) that identifies the program within the channel for the program. This combination of the identifiers is the aforementioned program ID information, and the term "program ID information" is hereafter used to represent this combination.

Figure 6:
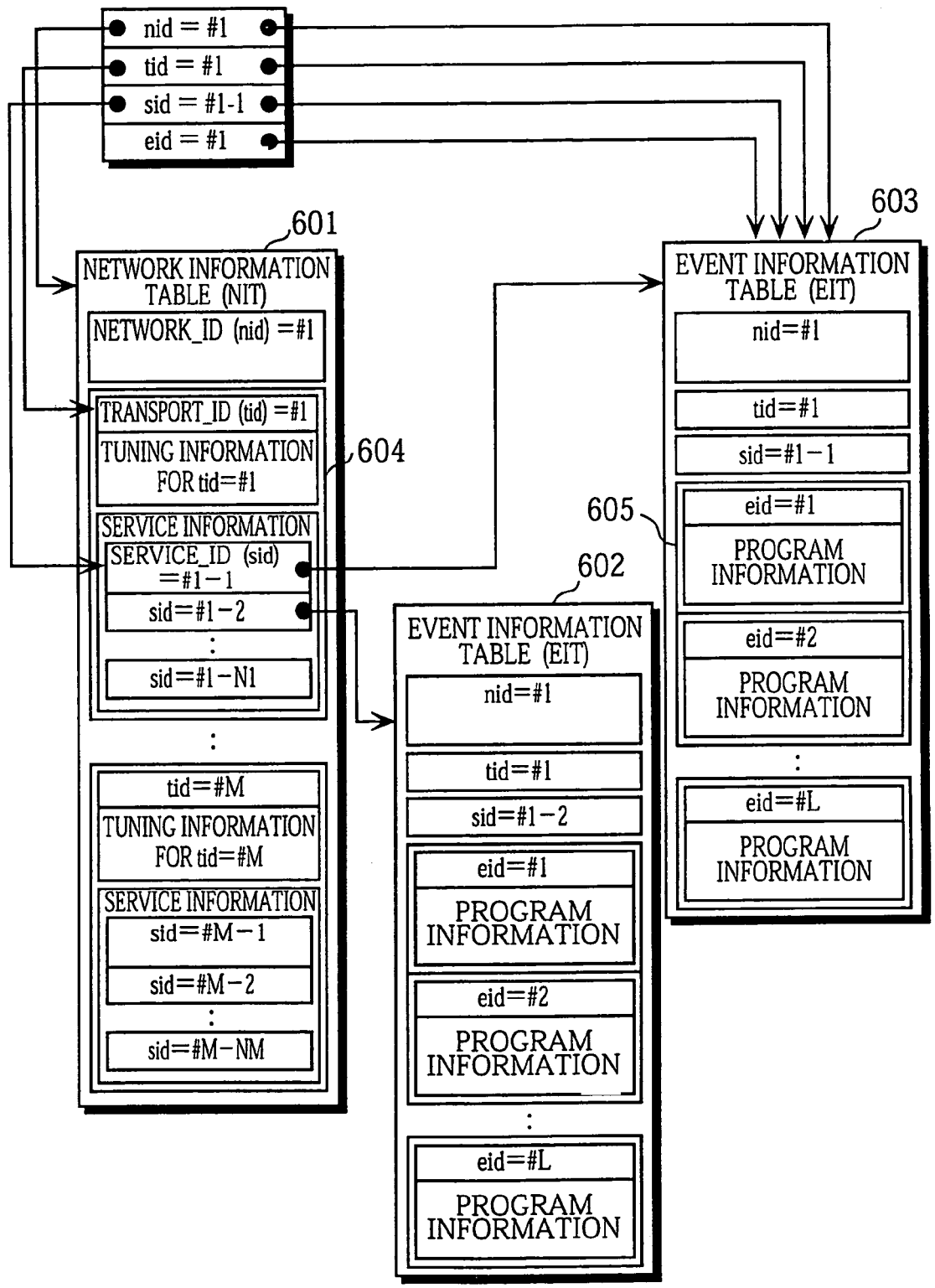
FIG. 6 shows program ID information and parts of program-related information.

FIG. 6 shows the program ID information and parts of the program-related information.

This program-related information contains the Network Information Table (NIT) 601 and the Event Information Tables (EITs) 602–603.

The nid in the program ID information specifies an NIT that contains sets of information relating to one network.

The tid specifies one set of tuning information (satellite_delivery_system_descriptor), such as a frequency used for one transmission via one physical channel, out of sets of tuning information contained in the information for one network.

The sid specifies one service relating to one transmission specified by a set of tuning information.

Service information (service_list_descriptor), which corresponds to one set of tuning information, contains a plurality of valid sids.

The eid specifies, out of sets of program information contained in one EIT for one service, a set of program information that shows a broadcast starting time, a program duration, and other information for one program.

In order to receive and reproduce a program desired by a viewer, the receiving device 202 selectively separates and extracts the program-related information being broadcasted to obtain the NIT, the tuning information, a service in the service information, and the program information that correspond to the desired program according to the viewer's instruction given via the operating device 203/204. Based on the obtained information, the receiving device 202 receives the program.

NITs and EITs are broadcasted after having been multiplexed as the data information into a transport stream. The receiving device 202 extracts a necessary NIT and EIT from the transport stream as follows. First, the CPU 309 in the receiving device 202 sets a multiplexing identifier such as a packet ID (PID) and a table ID (table_id) in the demultiplexer 303 as filtering conditions. The demultiplexer 303 then separates and extracts an NIT or an EIT that meets the set filtering conditions, and sends the extracted NIT or EIT to the memory unit 310 so that the CPU 309 can refer to it.

The receiving device 202 obtains the program ID information that specifies a program desired by the viewer by displaying an EPG table on the TV monitor 304 based on information, used to display the EPG table, that has been multiplexed along with a program into a digital broadcast, and by having the viewer select the desired program in the displayed EPG table.

After obtaining the program ID information, the receiving device 202 obtains, under the control of the CPU 309, the NIT corresponding to the nid in the obtained program ID information, that is, the table that can be specified by the PID=0x0010, the table_id=0x40, and the nid.

Following this, the receiving device 202 finds, out of sets of tuning information contained in the found NIT, a set of tuning information 604 specified by the tid in the obtained program ID information. Following this, the CPU 309 searches a plurality of valid sids contained in service information corresponding to the obtained tuning information 604 for the sid in the obtained program ID information. On finding a matching sid, the CPU 209 confirms that the sid in the obtained program ID information is valid. The CPU 309 then obtains a frequency, a modulation method, and other necessary information according to the tuning information 604, and controls the tuner 302 to have it tune to the appropriate frequency. The CPU 309 then finds the EITs 603–604, referring to the PID=0x0012 and the table_id=0x4E, and obtains program information 605, contained in the found EIT 603, that corresponds to the eid in the program ID information. As a result, the receiving device 202 obtains a broadcast starting time and a program duration written in the obtained program information 605.

The following describes control instructing information that is contained in an EIT and that is unique to the present invention.

Various types of information contained in an NIT and an EIT are written as descriptors.

Figure 7:
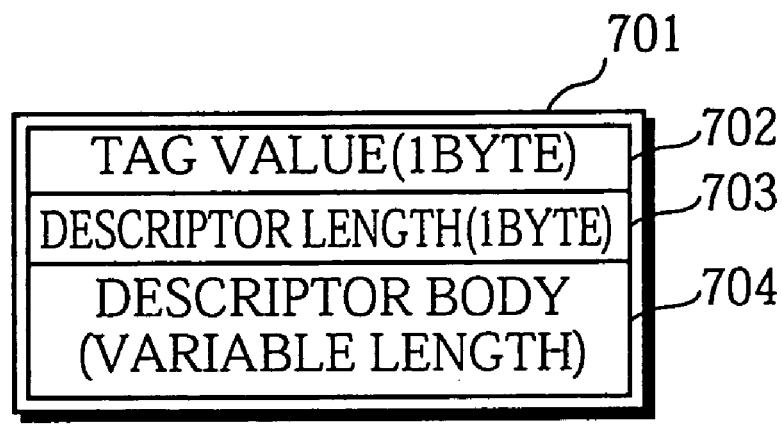
FIG. 7 shows a data construction of a descriptor.

FIG. 7 shows a data construction of a descriptor. As shown in the figure, a descriptor 701 is composed of a one-byte tag value 702 that shows a type of contents of the descriptor, a one-byte descriptor length 703 showing the descriptor data size, and a descriptor body 704 of a variable length.

For instance, each set of tuning information in an NIT is written as a descriptor whose tag value is 0x41, and each set of service information in an NIT is written as a descriptor whose tag value is 0x43.

Figure 8:
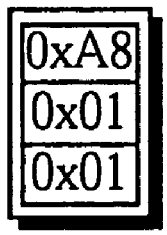
FIG. 8 shows an example descriptor for control instructing information.

FIG. 8 shows an example of the control instructing information written as a descriptor. The control instructing information instructs the receiving device 202 to send the program ID information to the operating devices 203–204. The host stations 206–207 insert this control instructing information into an EIT, and broadcasts it with a program that offers a prize.

As shown in the figure, the control instructing information is written as a descriptor whose tag value is 0xA8 which is a user defined value. The descriptor length and the descriptor body of the control instructing information are not referred to, and therefore represented by 0x01, for instance.

Figure 9:
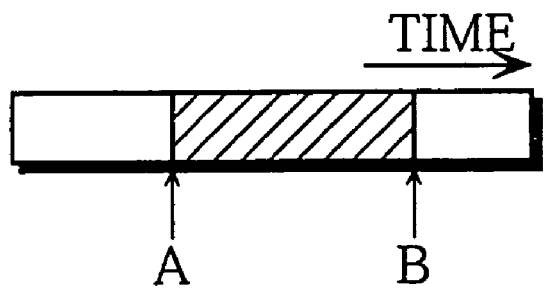
FIG. 9 shows a broadcasting period for a program offering a prize to an audience.

FIG. 9 shows a broadcast period of the program offering a prize. The host station 206/207 broadcasts the control instructing information during the broadcast period that starts at "A" and ends at "B".

<Program ID Information Sent from Receiving Device 202 to Operating Device 203/204>

The following describes a data construction used by the receiving device 202 to send the program ID information to the operating device 203/204.

FIG. 10 shows an example data construction and contents of the first transmission data that contains the program ID information sent by the receiving device 202 to the operating device 203/204.

As shown in the figure, the first transmission data is composed of the following fields: a one-byte notification tag field 801 whose content is a fixed value 0x00; a two-byte nid description field 802; a two-byte tid description field 803; an two-byte sid description field 804; and a two-byte eid description field 805.

This first transmission data shows the program ID information consisting of the nid=0x1234, the tid=0x0005, the sid=0x0006, and the eid=0x7890.

<Information Sent from Operating Device 203/204 to Host Station 206/207>

The following describes the information to be sent from the operating device 203/204 to the host station 206/207. This information is hereafter called "device-program information".

FIG. 11 shows example data construction and contents for the device-program information.

As shown in the figure, the device-program information is composed of the following fields: a one-byte notification tag field 901 whose content is a fixed value 0x01; a two-byte nid description field 902; a two-byte tid description field 903; a two-byte sid description field 904; a two-byte eid description field 905; and a one-byte phone number length description field 906; and a phone number description field 907 of a variable length.

This device-program information shows that the nid=0x1234, the tid=0x0005, the sid=0x0006, the eid=0x7890, and the phone number of the operating device 203/204 is "09087654321".

<Construction of Device-Program Information Stored by Host Station 206/207>

The following describes the data construction used by the host station 206/207 to store the device-program information which has been sent from the operating device 203/204.

On receiving the device-program information from the operating device 203/204, the host station 206/207 places the device-program information into the memory unit 502 or the hard disk unit 507 by arranging information on the operating device 203/204 into a device information format and arranging the program ID information into a program information data format. The host station 206/207 manages the device-program information using these two formats.

Figure 12:
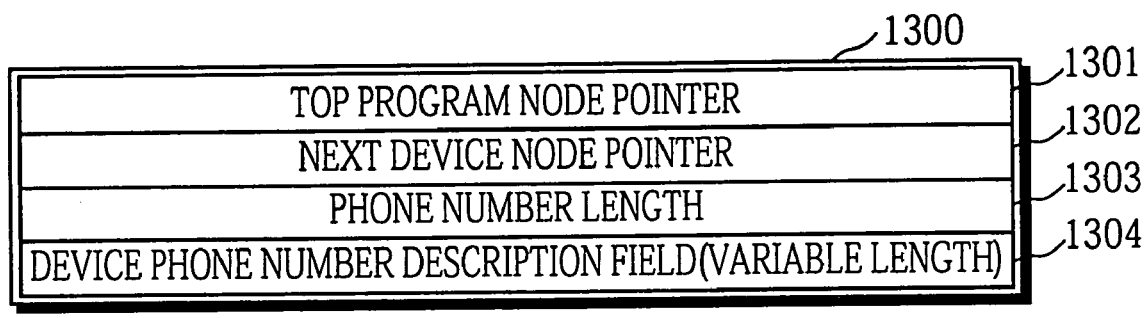
FIG. 12 shows a device information format.

FIG. 12 shows a device information format 1300, which is composed of the following elements: a top program node pointer 1301; a next device node pointer 1302; a phone number length 1303; and a device phone number description field 1304.

Here, a "program node" refers to an information set in the program information format, and a "device node" refers to an information set in the device information format.

Figure 13:
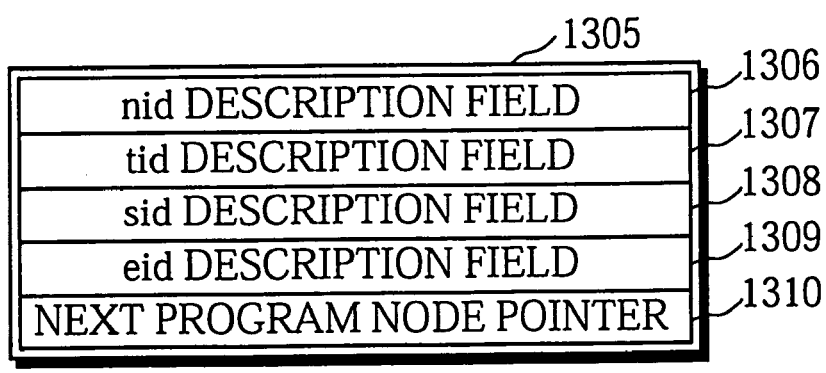
FIG. 13 shows a program information format.

FIG. 13 shows the program information format 1305, which is composed of the following elements: an nid description field 1306; a tid description field 1307; an sid description field 1308; an eid description field 1309; and a next program node pointer 1310.

Figure 14:
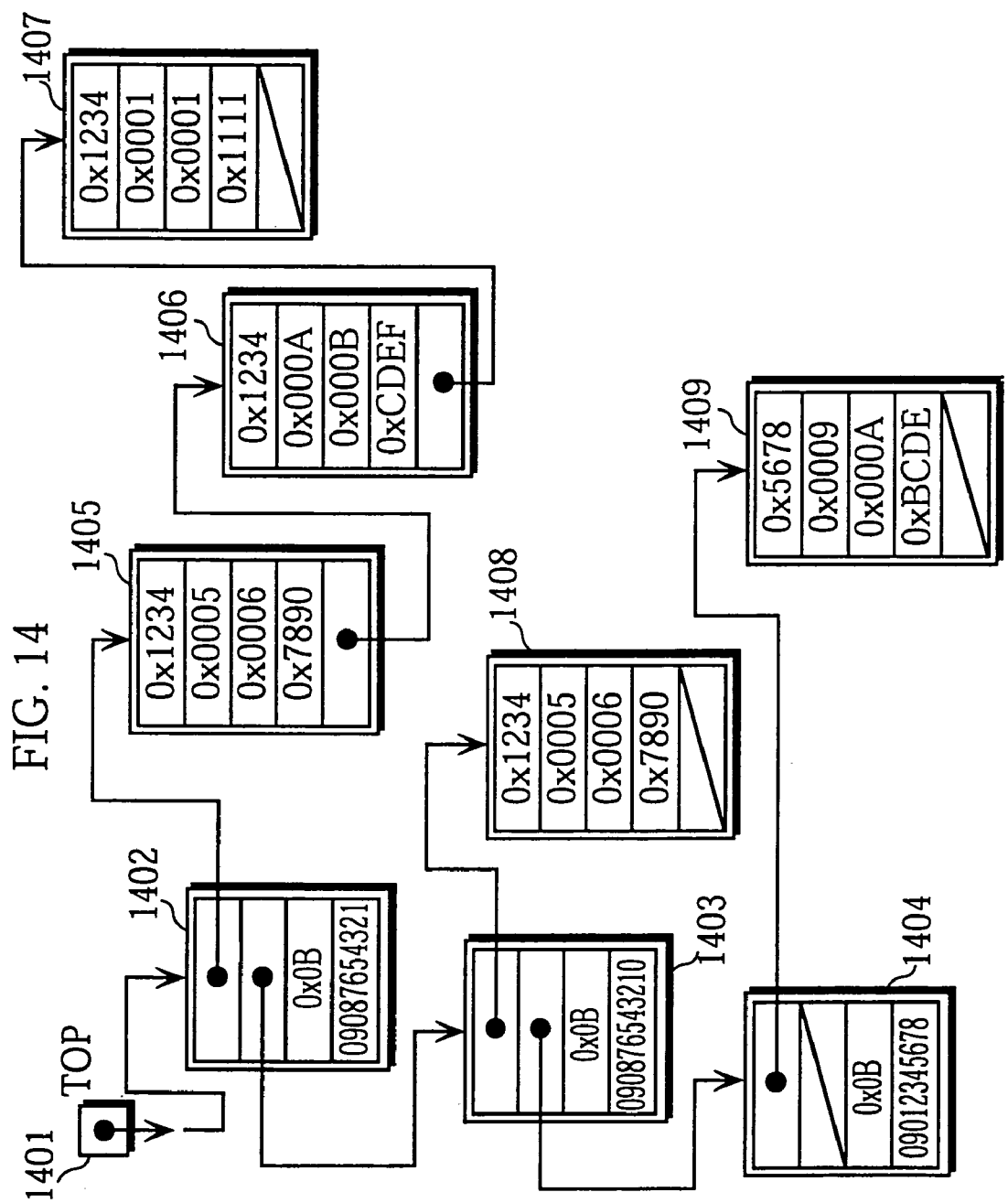
FIG. 14 shows an example data construction of device-program information which the host station 206/207 stores using the data constructions shown in FIGS. 12 and 13.

FIG. 14 shows an example data construction for the device-program information which the host station 206/207 stores using the data constructions shown in FIGS. 12 and 13.

In FIG. 14, a variable TOP 1401 represents a pointer to a start of a plurality of device nodes (i.e., a device node 1402 to a device node 1404) which are chained together.

The device node 1402 is also linked to a program node 1405, which is linked to a program node 1406, which is in turn linked to a program node 1407. The device node 1403 is linked to a program node 1408, while the device node 1404 is linked to a program node 1409.

Detailed Processing of Digital Broadcast System 200

The following describes a set of operations performed by the digital broadcast system 200 in detail, where a program offering prizes is broadcasted to viewers, viewers apply for the prizes, user applications are processed, and the winners are decided.

<Operations of Host Station 206/207>

The host station 206/207 broadcasts program-related information, which includes EITs containing the control instructing information described above, while broadcasting a program offering prizes to viewers.

<Operations of Receiving Device 202>

Figure 15:
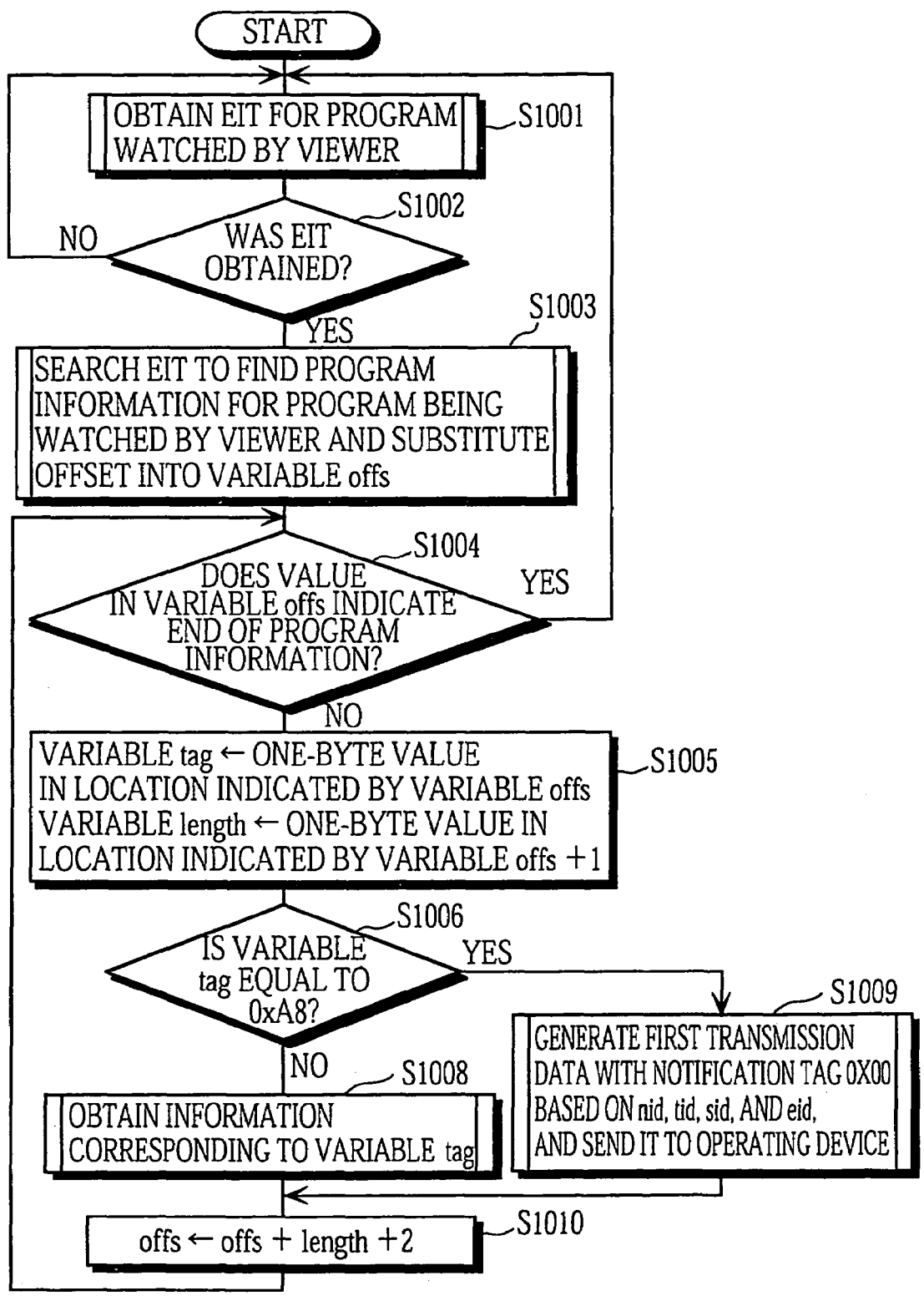
FIG. 15 is a flowchart showing the processing, which the receiving device 202 performs after having received the program-related information while reproducing a program.

The receiving device 202 performs the processing shown in FIG. 15 while receiving and reproducing a program that has been broadcasted from the host station 206/207 in accordance with a viewer's operation. Note that the receiving device 202 also performs this processing shown in FIG. 15 when reproducing a previously-recorded program in accordance with a viewer's operation.

FIG. 15 is a flowchart showing a procedure performed by the receiving device 202 when the program-related information is received during program reproduction. The CPU 309 in the receiving device 202 performs this procedure by executing the control program in the memory unit 310 while controlling other units such as the tuner 302, the demultiplexer 303, and the IR data send/receive unit 311.

The receiving device 202 obtains an EIT that corresponds to a program which it is currently receiving in accordance with a viewer's instruction, that is, the program being watched by the viewer, and places the obtained EIT into the memory unit 310 (steps S1001–S1002). The receiving device 202 obtains an EIT whenever it starts reproducing a program or switches between programs.

After the EIT has been placed into the memory unit 310, the CPU 309 searches the obtained EIT to find program information for the program being watched, and assigns an offset of the found program information to a variable offs (step S1003). Here, the "offset" of the program information refers to a start address of the program information stored in the memory unit 310.

Following this, the CPU 309 performs processing in accordance with a set of information stored as a descriptor in the found program information (steps S1005–S1010) until it judges that the value of the variable offs represents the end of the program information (step S1004).

In more detail, the CPU 301 substitutes a one-byte value stored in the location indicated by the variable offs into a variable tag while substituting a one-byte value in the location indicated by the variable offs +1 into the variable length (step s1005), before judging if the value in the variable tag is 0xA8 representing the control instructing information (step S1006).

If so, that is, the control instructing information has been detected, the receiving device 202 generates the first transmission data by attaching a notification tag 0x00 to the program ID information that is contained in the found EIT and that corresponds to the program currently being watched. The receiving device 202 then sends the generated first transmission data via the IR data send/receive unit 311 to the operating device 203/204 (step S1009). In this way, the receiving device 202 sends the first transmission data shown in FIG. 10. Following this, the receiving device 202 substitutes the sum of the values of the variable offs and the variable length and 2 into the variable offs (step S1010), and returns the control flow to step S1004.

On the other hand, on judging that the value in the variable tag is not 0xA8 (step S1006), the receiving device 202 obtains information corresponding to the value in the variable tag (step S1008), performs the processing in step S1010, and returns the control flow to step S1004.

<Operations of Operating Devices 203–204>

Figure 16:
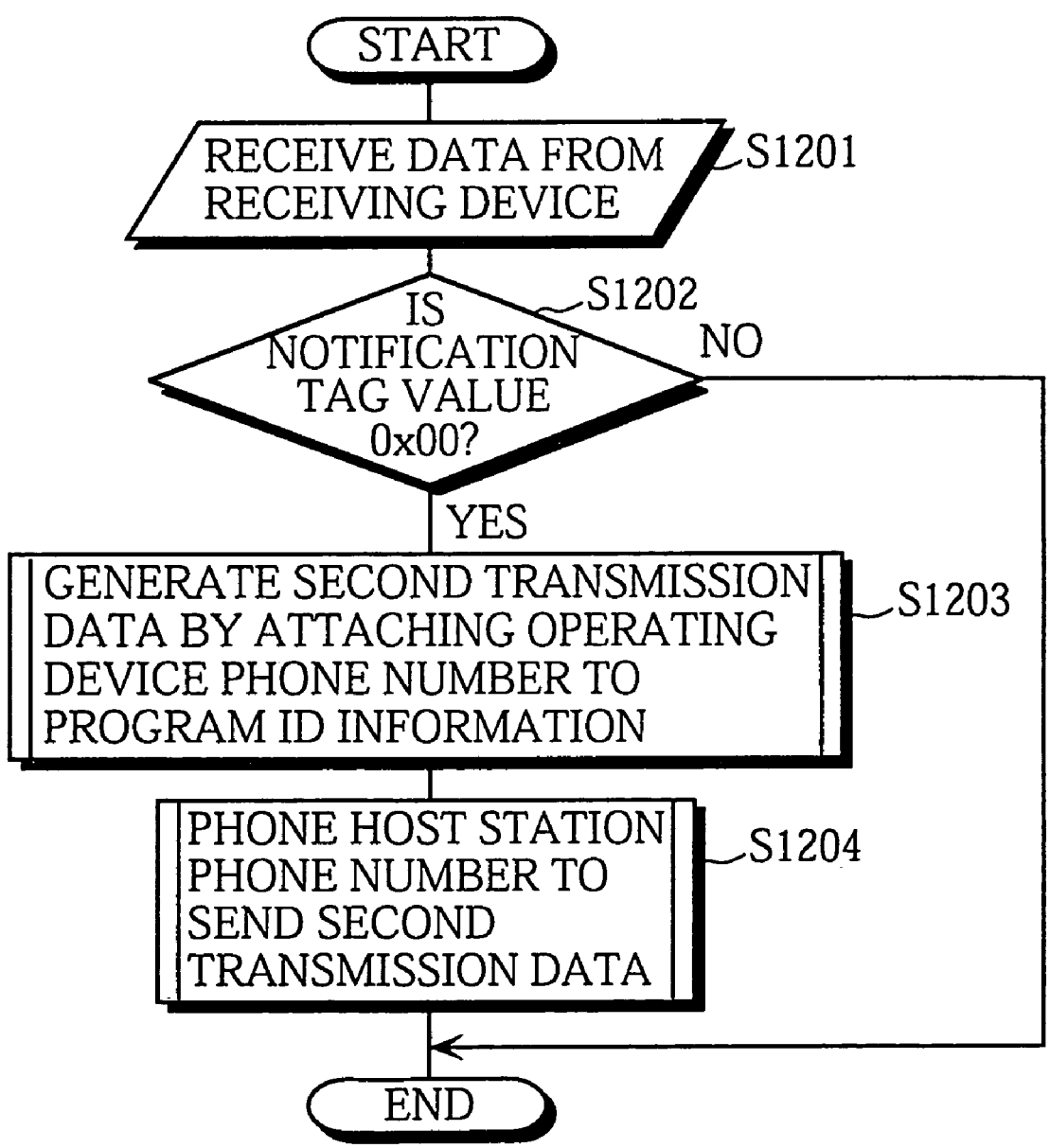
FIG. 16 is a flowchart showing the processing, which the operating device 202 performs after having received the first transmission data from the receiving device 202.

FIG. 16 is a flowchart showing a procedure performed by the operating device 203 when it has received the first transmission data from the receiving device 202. The CPU 408 in the operating device 203 performs this procedure by executing a control program in the memory unit 409 while controlling other units such as the tuner 402, the multiplexer/demultiplexer 403, the encoder/decoder 406, and the IR data send/receive unit 410.

On receiving data via the IR data send/receive unit 410 from the receiving device 202 (step S1201), the CPU 408 judges if the received data contains program ID information, that is, if the received data is the first transmission data, by recognizing if the notification tag of the data is 0x00 (step S1202).

If so, the CPU 408 attaches the phone number of the operating device 203, which is stored in the data memory unit 411 as shown in FIG. 4, and a notification tag 0x01 to the program ID information in the received first transmission data to generate the second transmission data (step S1203). For instance, when receiving the first transmission data shown in FIG. 10, the CPU 408 generates the device-program information in FIG. 11 as the second transmission data.

The CPU 408 then controls the tuner 402 to phone the phone number of the host station 206/207 which is stored in the data memory unit 411 and sends the second transmission data (step S1204).

As a result of the above processing, the viewer will be automatically entered the prize contest in the program he is watching via his operating device 203.

<Operations of Host Station 206/207 that has Received Second Transmission Data>

Figure 17:
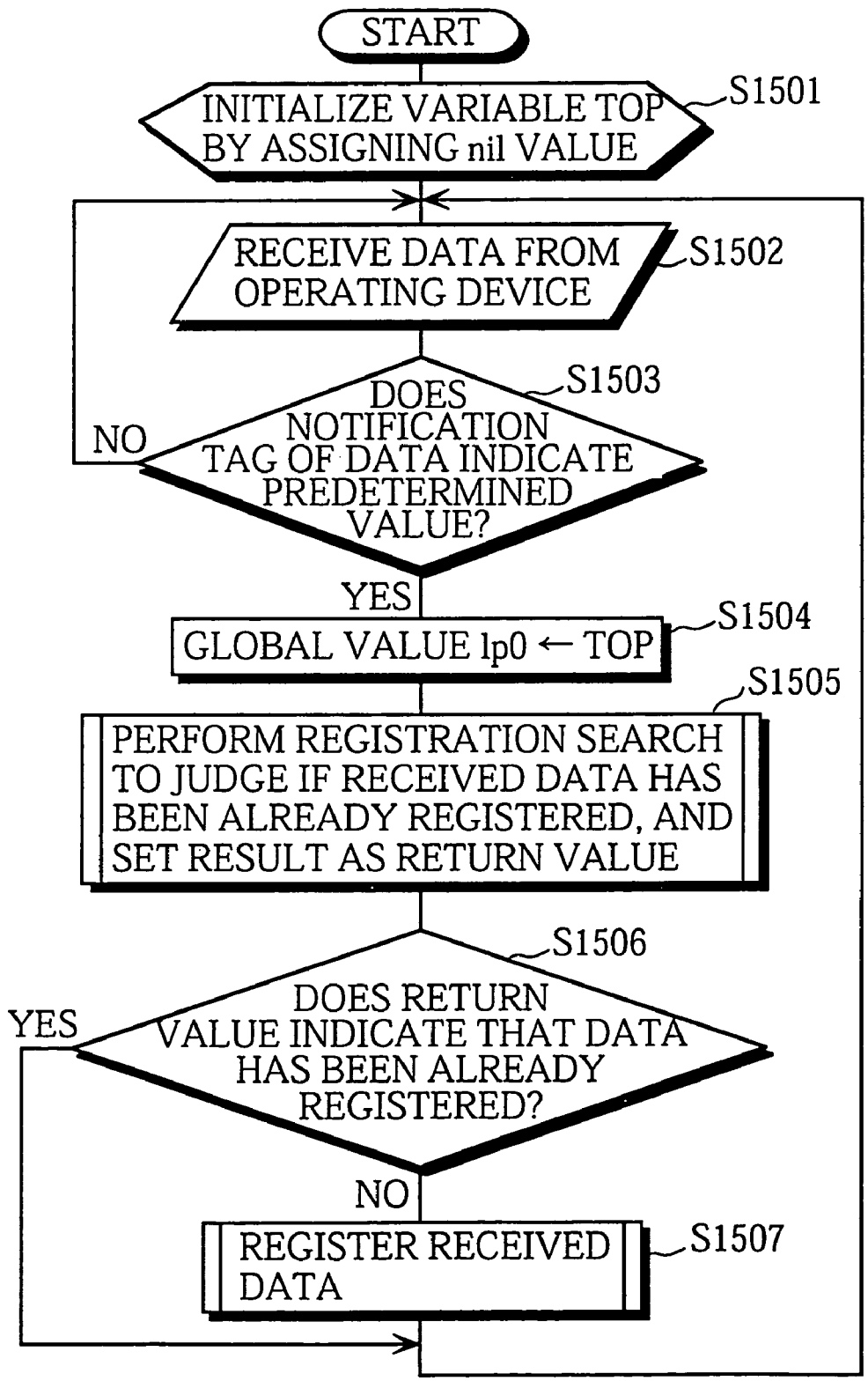
FIG. 17 is a flowchart showing the processing, which the host station 206 performs after having received the second transmission data from the operating device 203.

FIG. 17 is a flowchart showing the processing of the host station 206 to store the second transmission data that has been transmitted from the operating device 203/204. The CPU 501 in the host station 206 performs this processing by executing a control program in the memory unit 502 while controlling other units such as the communication unit 508.

The CPU 501 initializes the variable TOP in FIG. 14 by substituting nil showing that the value of the variable TOP is invalid into the variable TOP (step S1501).

On receiving data via the communication unit 508 from the operating device 203/204 (step S1502), the CPU 501 judges if the transmitted data is the device-program information, that is, the second transmission data containing the program ID information and the operating device phone number by recognizing if the notification tag of the transmitted data is 0x01 (step S1503).

If so, the CPU 501 substitutes the value in the variable TOP into a global variable lp0 (step S1504), and searches the memory unit 502 or the hard disk unit 507 to judge if the received second transmission data has already been stored in the memory unit 502 or the hard disk unit 507 (step S1505). This search will be described later in detail.

The CPU 501 store the second transmission data into the memory unit 502 or the hard disk unit 507 (step S1507) only when it finds that the received second transmission data has not been stored yet (step S1506). This is to say, the CPU 501 avoids registering the same second transmission data more than once by referring to the operating device phone number of each viewer and the program ID information specifying the program watched by the viewer.

Here, the CPU 501 registers the received second transmission data, using the device information format and the program information format shown in FIGS. 12 and 13. The host station 206/207 later selects a prizewinner out of the data that has been registered in this way. This registration processing in step S1507 will be described later in detail.

The following describes the search in step S1505 in detail.

Figure 18:
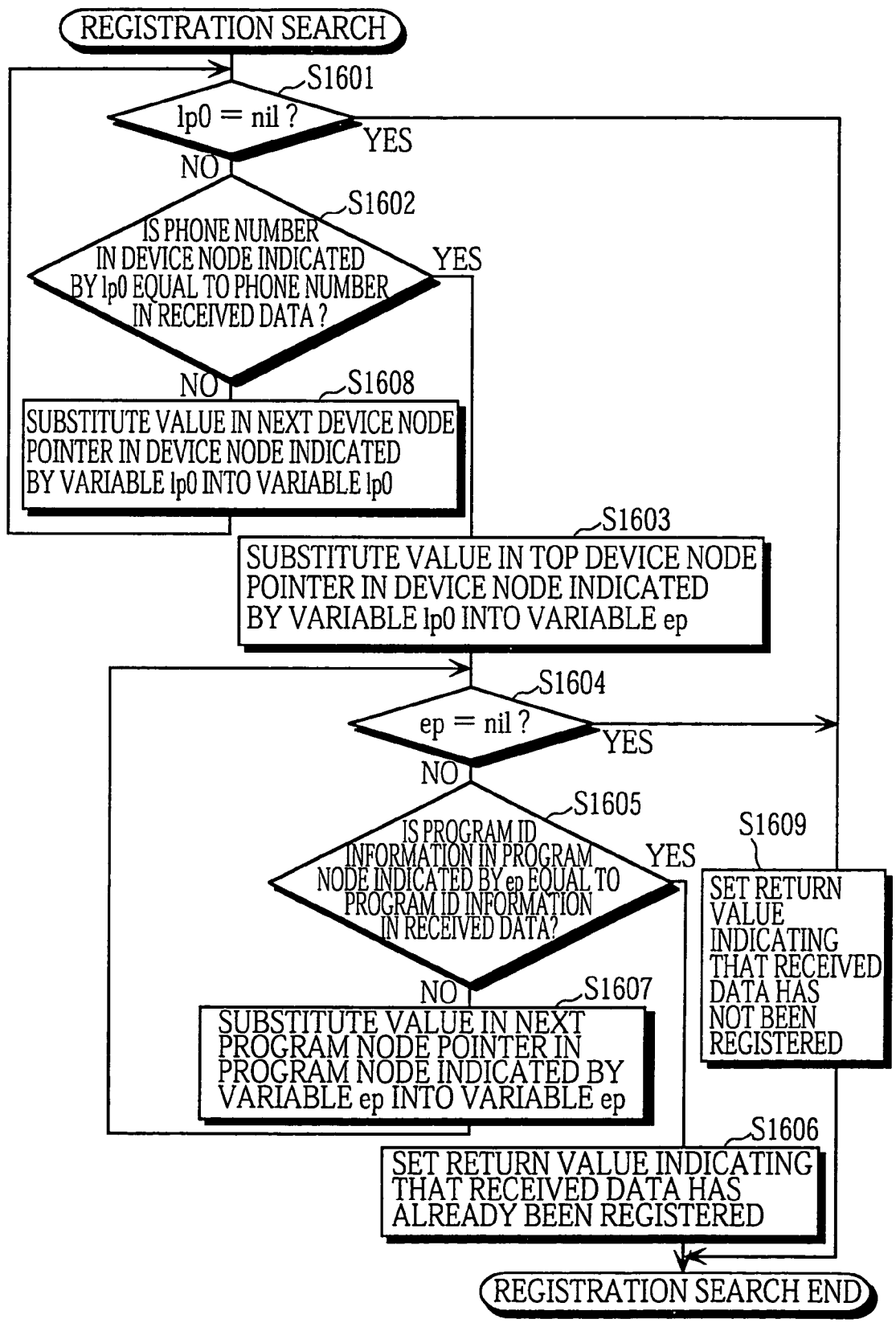
FIG. 18 is a flowchart showing a registration search in step S1505 in FIG. 17 performed by a CPU 501 in the host station 206.

FIG. 18 is a flowchart showing this processing.

The CPU 501 judges if the global variable lp0 is nil (step S1601). If so, the CPU 501 sets a return value as indicating that the received second transmission data has not been registered yet (step S1609), and terminates the search.

On the other hand, on judging that the global variable lp0 is not nil, meaning the global variable lp0 indicates a device node, the CPU 501 further judges if the content of the device phone number description field in the device node indicated by the global variable lp0 is the same as the phone number written in the received second transmission data (step S1602). If not, which means that the second transmission data has been sent from a different operating device to the operating device currently indicated by the global variable lp0, the CPU 501 substitutes the value in the next device node pointer in the current-device node into the global variable lp0 (step S1608), and returns the control flow to step S1601 to make the judgement.

On judging that contents of the device phone number description field are equal to the phone number written in the received second transmission data in step S1602, the CPU 501 substitutes the value in the top program node pointer in the device node indicated by the variable lp0 into a variable ep, which is a local variable used for the search (step S1603). Following this, the CPU 501 judges if the variable ep is nil (step S1604), and if not, which means that the variable ep indicates a program node, the CPU 501 judges if the program ID information in a program node indicated by the variable ep are equal to the program ID information written in the received second transmission data (step S1605). If so, the CPU 501 sets a return value as indicating that the received second transmission data has been already registered (step S1606) and terminates the search. If not, the CPU 501 substitutes the value in the next program node pointer in the same program node into the variable ep (step S1607), and returns the control flow to step S1604 to make the judgement.

On the other hand, on judging that the variable ep is nil in step S1604, the CPU 501 sets a return value as indicating that the received second transmission data has not been registered yet (step S1609), and terminates the search.

Note that when the CPU 501 sets a return value as indicating that the second transmission data has not been registered yet in step S1609, the global variable lp0 can indicate either nil or a device node for an operating device that sent the second transmission data. This is to say, the global variable lp0 indicates the former when a device node for the operating device that sent the second transmission data has not been produced yet, while the global variable lp0 indicates the latter when a program node corresponding to the second transmission data has not been produced yet although the device node for the operating device has been already produced.

The following describes the registration in step 1507 in FIG. 17 in detail.

Figure 19:
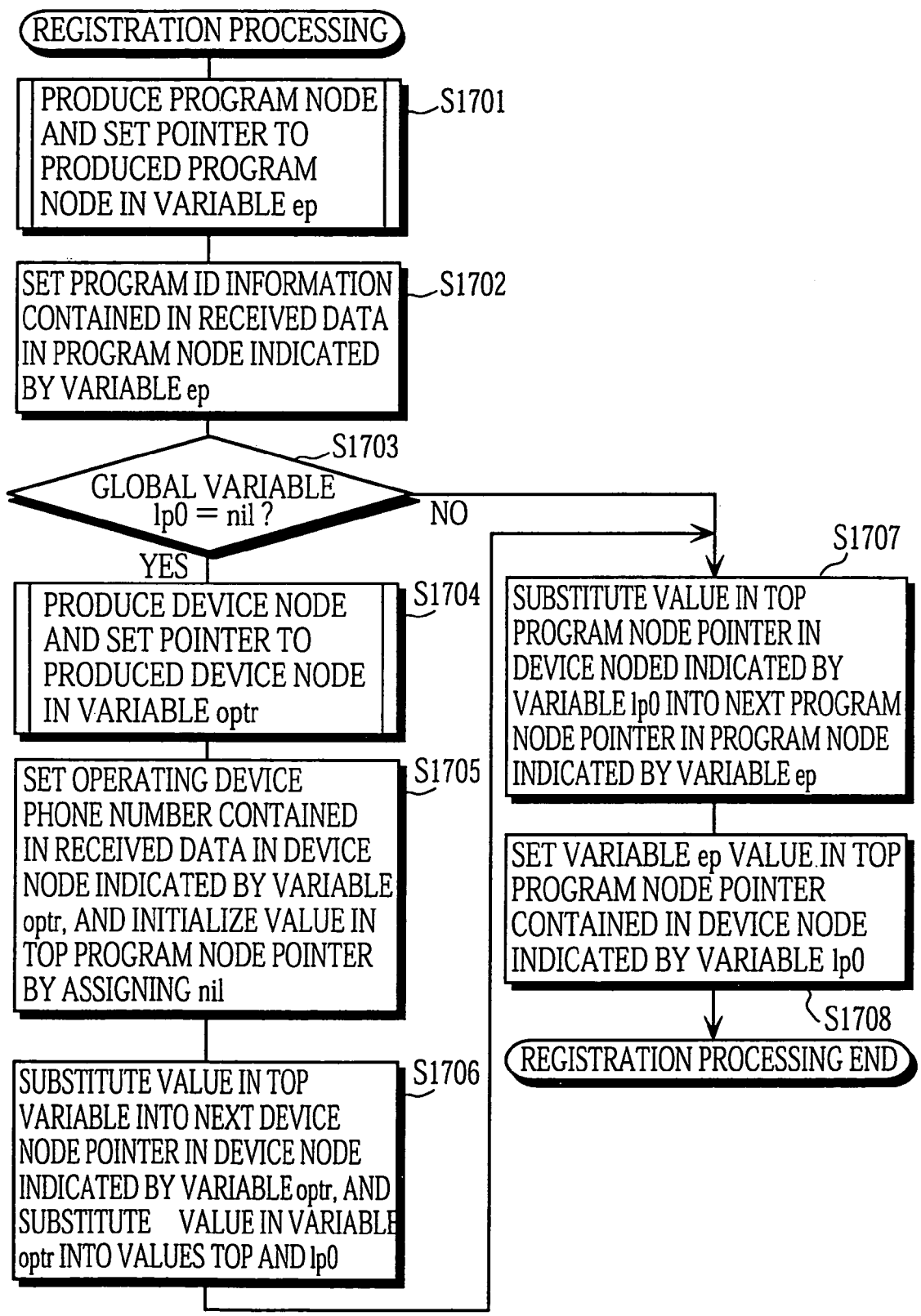
FIG. 19 is a flowchart showing registration performed by the CPU 501 in the host station 206.

FIG. 19 is a flowchart showing this processing performed by the CPU 501.

The CPU 501 produces a program node, sets a pointer to the produced program node in a variable ep (step S1701), and sets the program ID information written in the received second transmission data in the program node indicated by the variable ep, which is a local variable used for this registration (step S1702).

Following this, the CPU 501 judges if the global variable lp0 is nil (step S1703). If so, which means that a device node for the operating device that sent the second transmission data has not been produced yet, the CPU 501 produces a device node for the operating device, and sets a pointer to the produced device node in a local variable optr (step S1704). After this, the CPU 501 sets the phone number written in the second transmission data in the device phone number description field of the device node indicated by the local variable optr, and substitutes nil into the top program node pointer in the same device node (step S1705). The CPU 501 then substitutes the value in the variable TOP into the next device node pointer in the produced device node, and substitutes the value in the variable optr into the variables TOP and lp0 (step S1706). This processing results, when a plurality of other device nodes already exist, in the produced device node being placed between the variable TOP and a start of other device nodes, all of which are chained together.

The control flow moves to step S1707 from either step S1706 or from step S1703 if the CPU 501 judges that the global variable lp0 is not nil. The CPU 501 substitutes the value in the top program node pointer in the device node indicated by the variable lp0 into the next program node pointer in the program node indicated by the variable ep (step S1707), and substitutes the value in the variable ep into the top program node pointer in the device node indicated by the variable lp0 (S1708). This completes the registration of the second transmission data and links the produced device node to the produced program node at the start of a plurality of program nodes, all of which are chained together.

For instance, on receiving the second transmission document shown in FIG. 11 from the operating device 203/204 and on performing the above registration in FIG. 19, the host station 206 stores data as shown in FIG. 14, where a program node 1405 has been newly produced and inserted into the chained data construction. In this embodiment, there are a plurality of programs offering prizes as shown in the figure, and viewers who watch more of such programs are more likely to win a prize.

The host station 206 stores received second transmission data using the data construction shown in FIG. 14, and its CPU 501 selects a prizewinner out of viewers of programs when the predetermined time has come.

Figure 20:
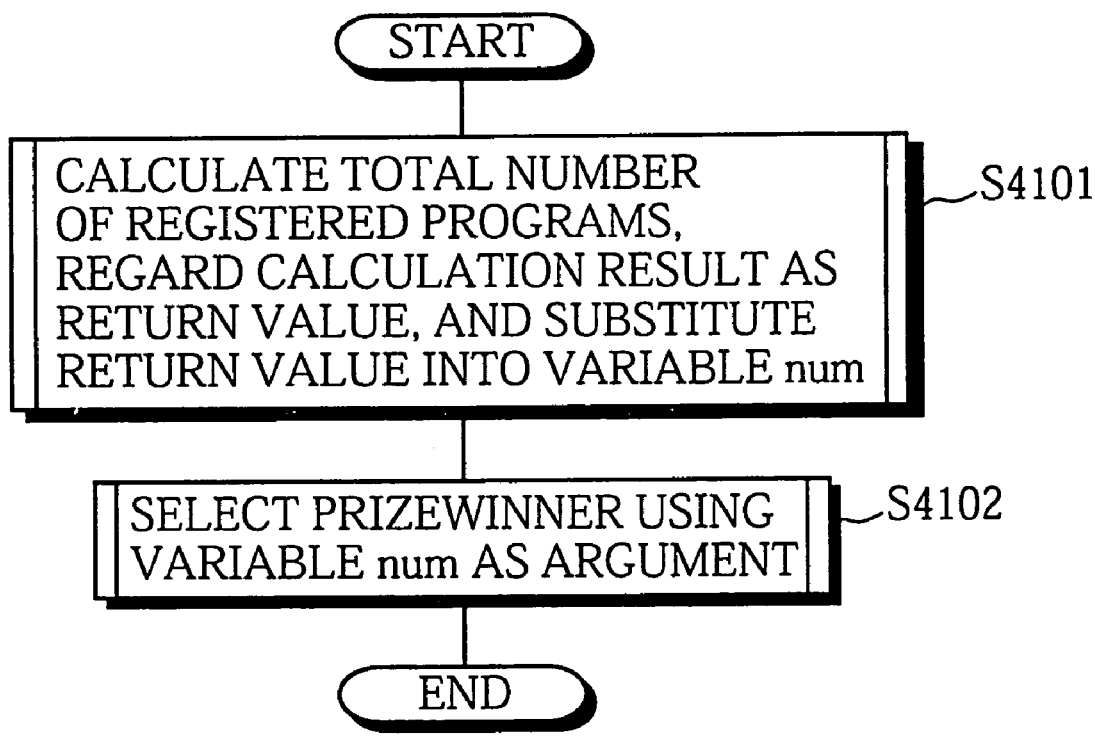
FIG. 20 is a flowchart showing the processing performed by the CPU 501 to select a prizewinner out of the audience.

FIG. 20 is a flowchart showing the processing performed by the CPU 501 to select a prizewinner.

The CPU 501 calculates the total number of viewings made by the viewers, and substitutes the return value obtained from the calculation into a variable num (step S4101). The CPU 501 then selects a prizewinner using the variable num as an argument (step S4102). The CPU 501 performs the above calculation and selection by invoking programs similar to subroutines, and controls other units such as the communication unit 508 for the selection.

The following describes the calculation in step S4101 and the selection in step S4102 in detail.

Figure 21:
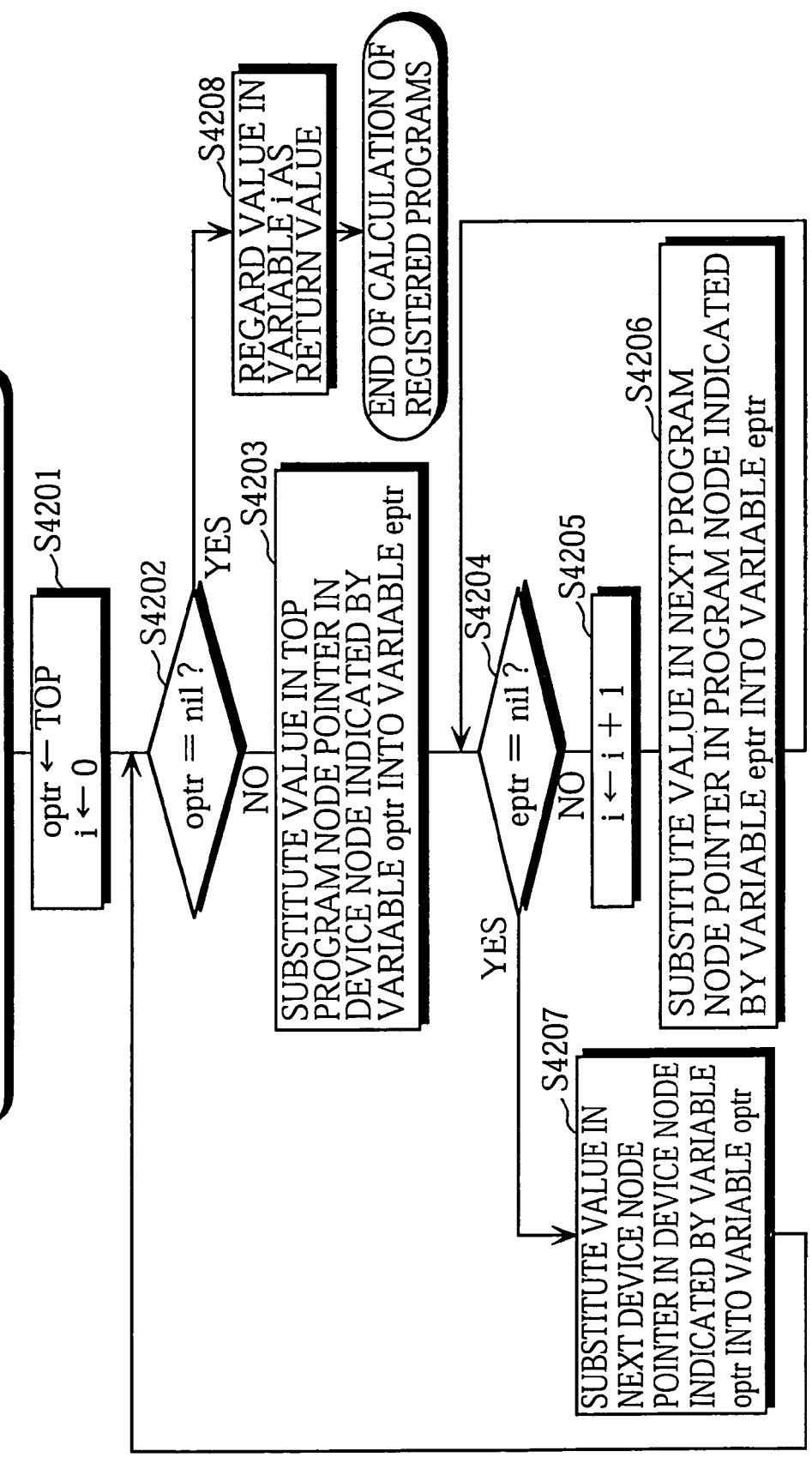
FIG. 21 is a flowchart showing the processing performed by the CPU 501 to calculate the total number of viewings made by viewers.

FIG. 21 is a flowchart showing the calculation processing in step 4101.

The CPU 501 substitutes the value in the variable TOP into the variable optr, and substitutes 0 as the initial value into a variable i, which is used to calculate the total number of viewings made by viewers (step S4201).

The CPU 501 then judges if the variable optr is nil (step S4202), and if not, the CPU 501 substitutes the value in the top program node pointer in the device node indicated by the variable optr into the variable eptr (step S4203).

Following this, the CPU 501 repeats the processing in step S4205 to increment the variable i by one and the processing in step S4206 to substitute the value in the next program node pointer in the program node indicated by the variable eptr into the variable eptr until it judges that the variable eptr is nil (step S4204).

On judging that the variable eptr is nil in step S4204, the CPU 501 substitutes the value in the next device node pointer in the device node indicated by the variable optr into the variable optr (step S4207), and judges if the variable optr is nil (step S4202).

If so, which means that the variable i at this point indicates the total number of viewings that have been made by all viewers, the CPU 501 regards the variable i as the return value (step S4208) and terminates the calculation processing.

Figure 22:
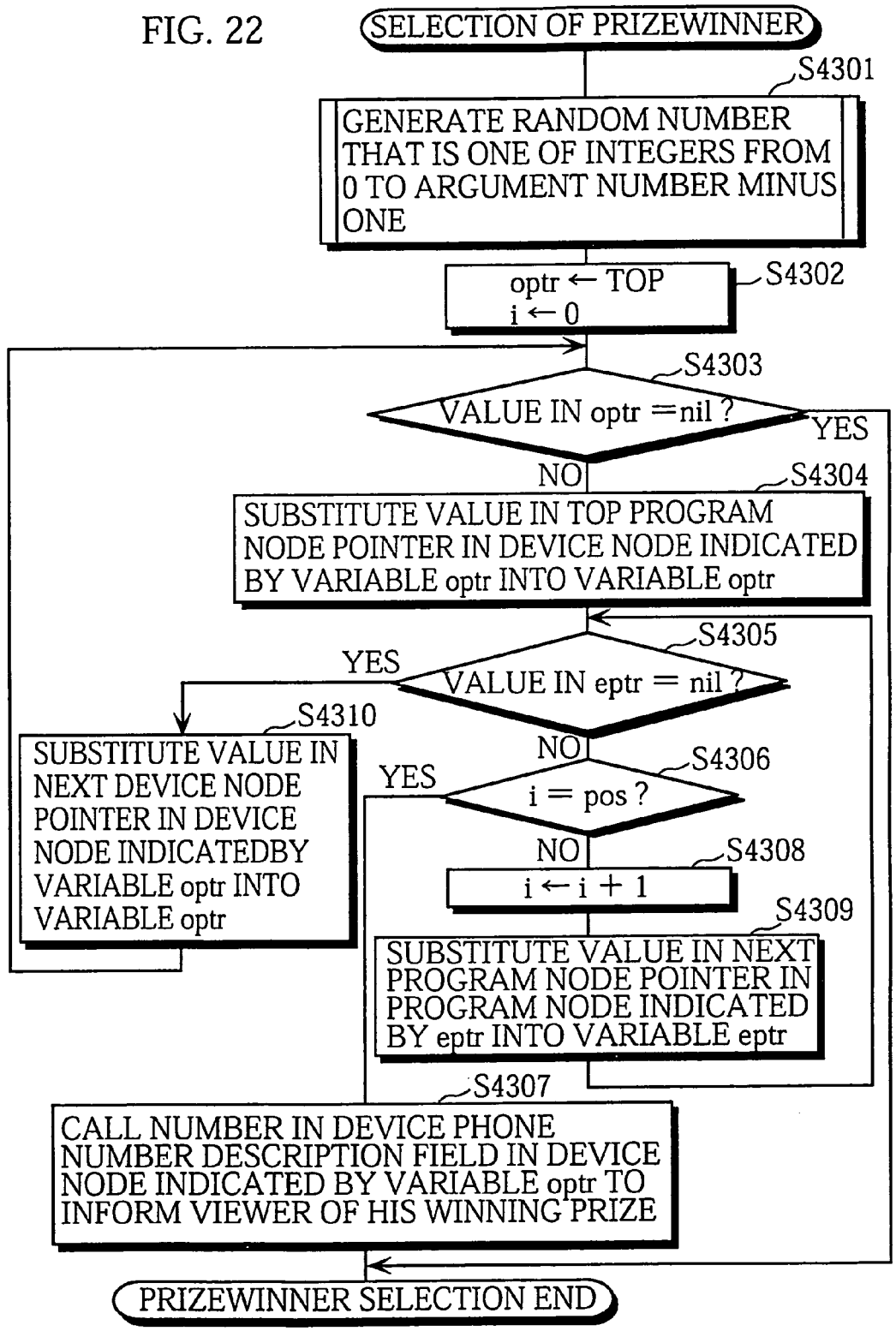
FIG. 22 is a flowchart showing the processing performed by the CPU 501 to select a prizewinner.

FIG. 22 is a flowchart showing the detailed processing in step S4102 in FIG. 20 performed by the CPU 501 to select a prizewinner.

The CPU 501 generates a random number that is an integer in a range from 0 to the argument minus one (step S4301). This argument has been generated by the calculation in step S4101 as the total number of viewings made by viewers. After this, the CPU 501 substitutes the generated random number into the variable pos (step s4301), and substitutes the value in the TOP variable and 0 respectively into the variable optr and the variable i (step S4302).

Following this, the CPU 501 judges if the variable optr is nil (step S4303). If so, the CPU 501 regards that there is no candidates for a prizewinner and so terminates the processing, or if not, the CPU 501 substitutes the value in the top program node pointer in the device node indicated by the variable optr into the variable eptr (step S4304).

The CPU 501 then judges if the variable eptr is nil (step S4305), and if so, the CPU 501 substitutes the value in the next device node pointer in the device node indicated by the variable optr into the variable optr (step S4310), and makes the judgement in step S4303.

When judging that the variable eptr is not nil in step S4305, the CPU 501 further judges if the variable i indicates the same value as the variable pos (step S4306). If not, the CPU 501 increments the variable i by one in step S4308, substitutes the value in the next program node pointer in the program node indicated by the variable eptr into the variable eptr in step S4309, and returns the control flow to step S4305.

When judging that the variable i indicates the same value as the variable pos, the CPU 501 controls the communication unit 508 to phone the phone number in the device phone number description field in the device node indicated by the variable optr, and send a message, which has been recorded in advance, to tell the viewer he has won a prize (step S4307). In this way, the host station 206 sends the notification message to the viewer's operating device 203/204.

Second Embodiment

The following describes the digital broadcast system according to the second embodiment of the present invention.

Digital Broadcast System Overview

The digital broadcast system of the second embodiment has basically the same construction as in the first embodiment (see FIG. 1) and comprises host stations, a receiving device, and operating devices. The present digital broadcast system is capable of providing services relating to a quiz show which it broadcasts. A viewer of this quiz show inputs an answer to a quiz question to his operating device and instructs the operating device to send the inputted answer to the host station. When this answer is correct, the host station notifies the viewer.

Broadcasting by Host Station

The host station of the second embodiment inserts the control instructing information as described in the first embodiment into an EIT, and broadcasts the EIT together with a quiz show.

Receiving Device

The receiving device of the present embodiment is the same as in the first embodiment (see FIG. 2). Specifically, the present receiving device detects the control instructing information while receiving the quiz show in accordance with the viewer's operation at the same time. On detecting the control instructing information, the receiving device sends to the operating device the program ID information for the quiz show in the format of the first transmission data shown in FIG. 10.

Operating Device

The operating device of the present embodiment has basically the same hardware construction as in the first embodiment although a memory unit in the present operating device stores a different control program from the program used for the first embodiment and the CPU executes this control program. This results in the present operating device performing the processing shown in FIG. 23 instead of the processing in FIG. 16 after receiving the first transmission data from the receiving device.

Figure 23:
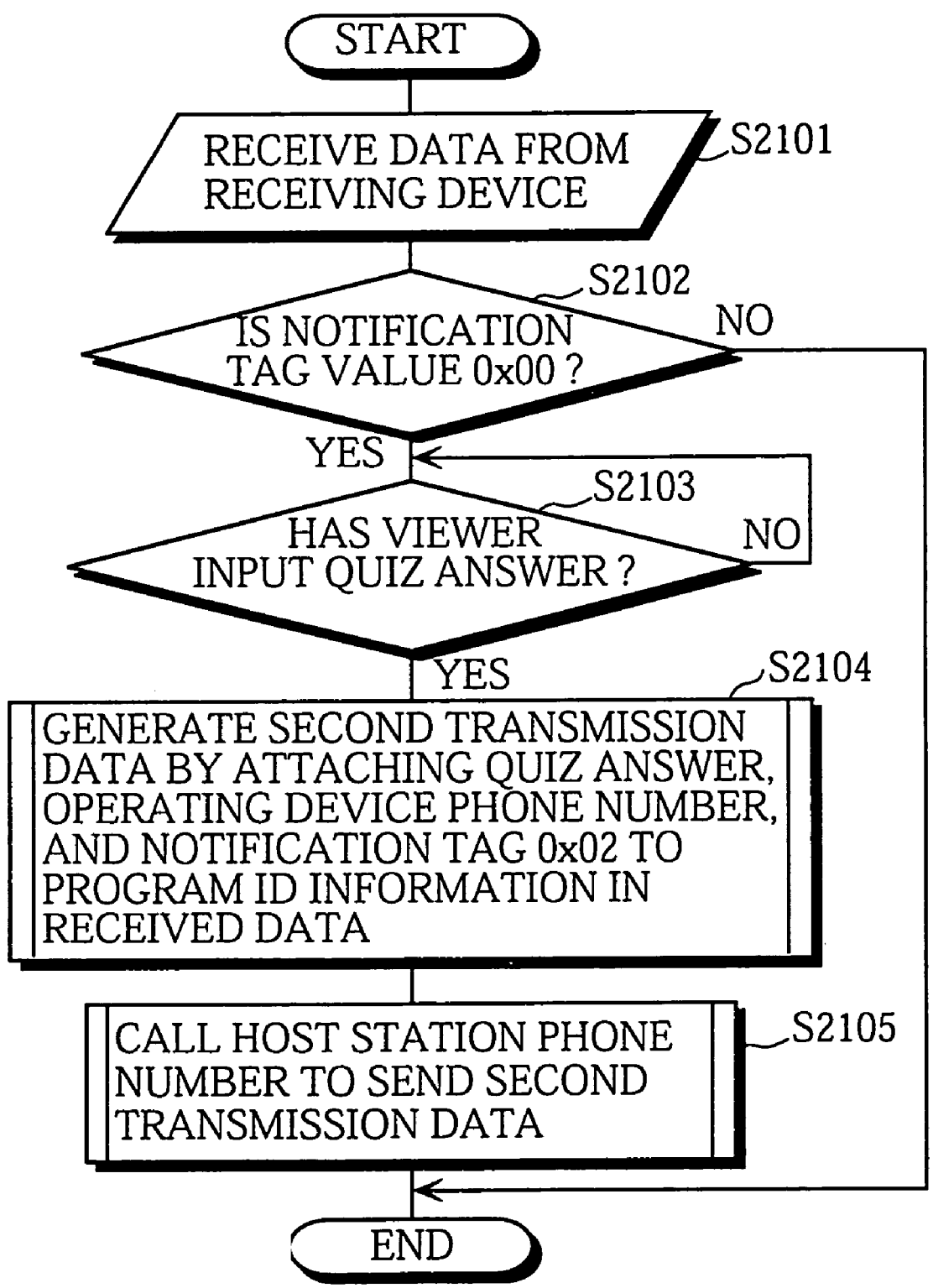
FIG. 23 is a flowchart showing the processing, which the operating device of the second embodiment performs after receiving data from the receiving device.

FIG. 23 is a flowchart showing this processing, which the CPU in the operating device performs while controlling other units such as the tuner, the multiplexer/demultiplexer, the encoder/decoder, and the IR data send/receive unit.

On receiving data via the IR data send/receive unit from the receiving device (step S2101), the CPU judges if the received data contains the program ID information by recognizing if a notification tag of the data is 0x00 (step S2102).

If so, the CPU awaits for an input of an answer to a quiz question from the viewer (step S2103), receives the viewer's answer, and attaches the viewer's answer and the phone number of the operating device, which is stored in the data memory unit as shown in FIG. 4, along with a notification tag 0x02 to the program ID information in the received data to generate the second transmission data (step S2104).

FIG. 24 shows example construction and contents of this second transmission data generated in step S2104. The second transmission data for the present embodiment is composed of the following fields: a notification tag field 1901; an nid description field 1902; a tid description field 1903; an sid description field 1904; an eid description field 1905; a quiz answer field 1906; a phone number length description field 1907; and a phone number description field 1908.

The CPU in the operating device generates this second transmission data shown in the figure when receiving the quiz answer input as 80 from the viewer and the first transmission data shown in FIG. 10 from the receiving device.

The CPU then controls the tuner and other units to phone the phone number of the host station and send the generated second transmission data to the host station (step S2105).

In this way, on receiving an input from the viewer of the quiz show, the operating device sends this quiz answer to the host station.

Reception of Quiz Answer by Host Station

The host station of the present embodiment has basically the same hardware construction as in the first embodiment although it stores a different control program from the first embodiment in the memory unit. The CPU in the host station therefore operates differently.

The following describes the processing of the present host station that has received the second transmission data from the operating device.

Figure 25:
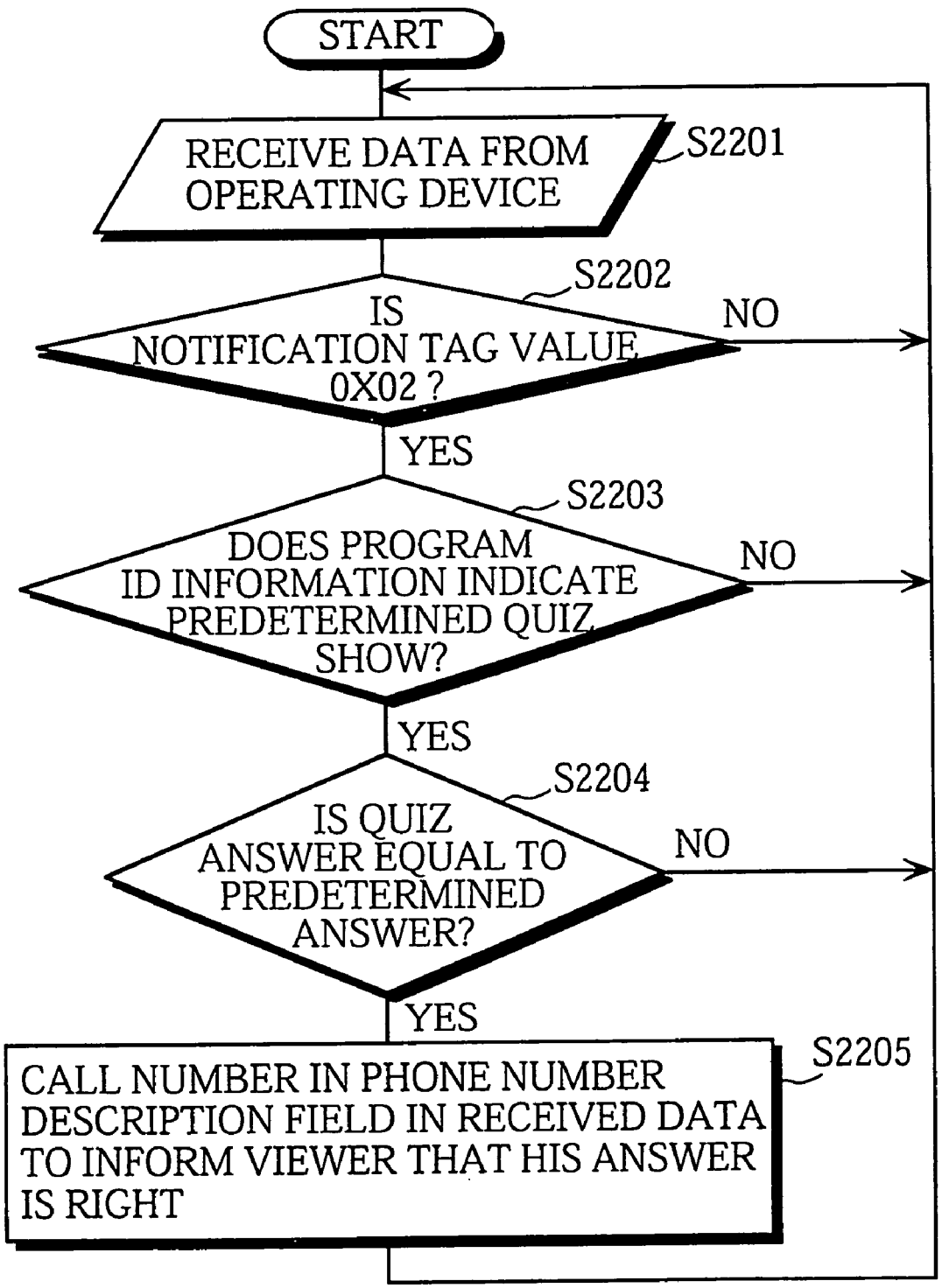
FIG. 25 is a flowchart showing the processing performed by the host station that has received the second transmission data from the operating device.

FIG. 25 is a flowchart showing this processing which the CPU in the receiving device perform by executing the control program in the memory unit and controlling other units such as the communication unit.

On receiving data via the communication unit from the operating device (step S2201), the CPU judges if the data is the second transmission data containing the viewer's quiz answer by recognizing if the notification tag of the data is 0x02 (step S2202).

If so, the CPU judges from the program ID information in the received second transmission data if a program specified by the program ID information is a predetermined quiz show (step S2203), and if so, the CPU further judges if the quiz answer is equal to a predetermined answer (step S2204). If so, the CPU controls the communication unit to phone the phone number in the phone number description field of the second transmission data and send an message notifying the viewer that his answer is right (step S2205), and returns the control flow to step S2201.

On the other hand, when judging that the notification tag is not 0x02 (step S2202), or that the program specified by the program ID information is not the predetermined quiz show (step S2203), or that the viewer's answer is not equal to the predetermined answer (step S2204), the CPU returns the control flow to step S2201 and awaits for incoming data.

As a result of the above processing by the host station, the viewer who has inputted a quiz answer while watching a predetermined quiz show can be informed when his answer is right.

Third Embodiment

The following describes the digital broadcast system according to the third embodiment of the present invention.

Digital Broadcast System Overview

The digital broadcast system of the present embodiment comprises host stations, a receiving device, and operating devices as in the first embodiment (see FIG. 1).

With the digital broadcast system of the present embodiment, the host station sends key information used to descramble a scrambled program to the receiving device in accordance with a broadcast being watched by the viewer and a viewer's operation. The receiving device descrambles the scrambled program using the key information when reproducing the program.

Broadcasting of Fee-Based PPV Programs and Commercials that Advertise Programs by Host Station The host station for the present embodiment inserts a descriptor containing the program ID information specifying a fee-based program such as a PPV program, and a tag whose value is 0xAA, which is a user defined value, into an EIT, and broadcasts the EIT together with a commercial that advertises the fee-based program. The above descriptor is hereafter called program order control information. The host station broadcasts the commercial several times before broadcasting the fee-based program.

When broadcasting the fee-based program, on the other hand, the host station broadcasts an EIT that contains a descriptor whose tag value is 0xA9, which is a user defined value. This descriptor is hereafter called fee-based program control information.

Figure 26:
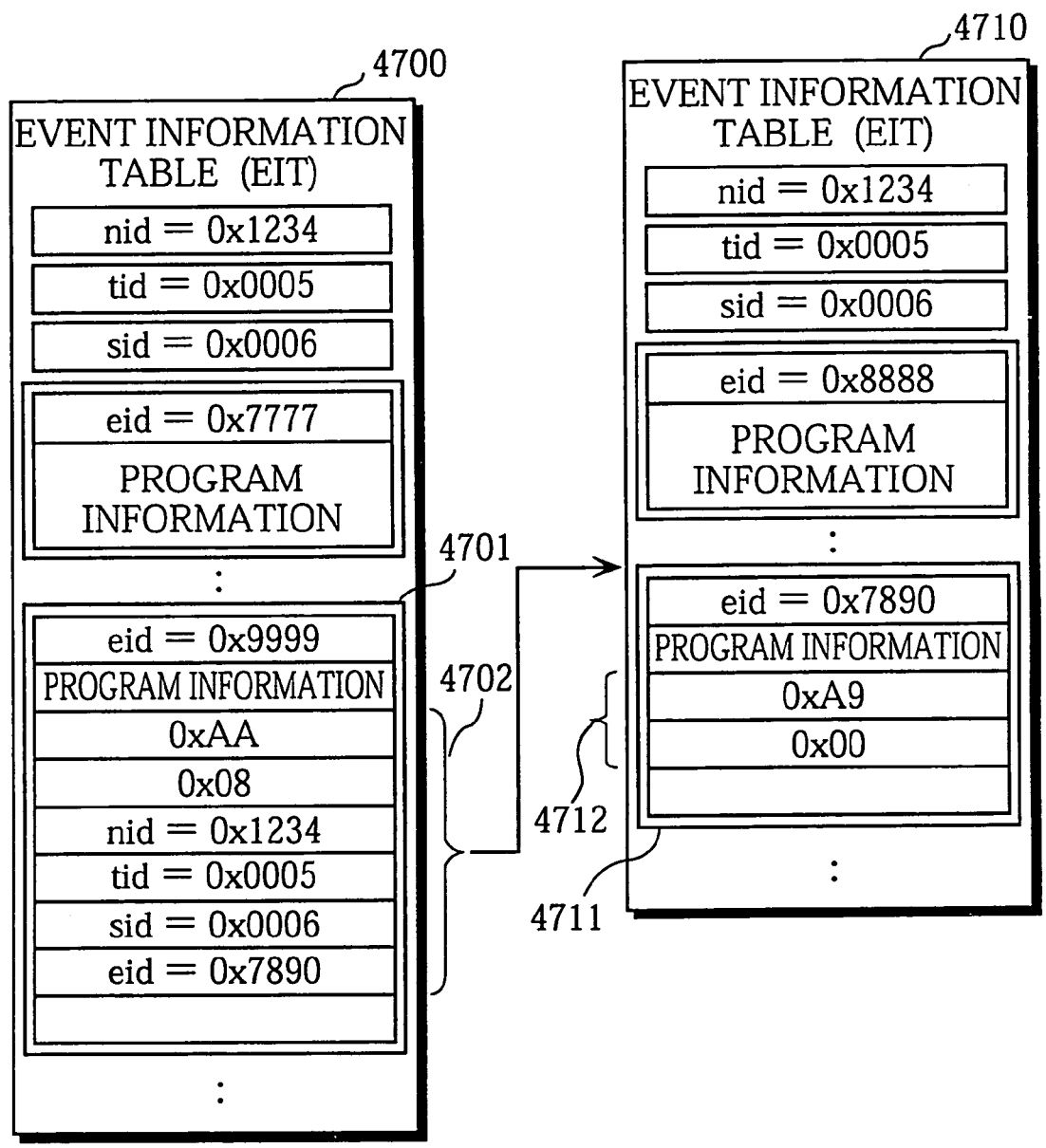
FIG. 26 shows example contents of an Event Information Table (EIT) 4700 broadcasted with a commercial advertising a fee-based program and an EIT 4710 broadcasted with the fee-based program.

FIG. 26 shows example contents of an EIT 4700 broadcasted with a commercial and an EIT 4710 broadcasted with a fee-based program advertised in the commercial.

The EIT 4700 contains program information having the eid=0x9999. This program information is for a commercial that advertises a fee-based program specified by the nid=0x1234, the tid=0x0005, the sid=0x0006, and the eid=0x7890, which are contained in program order control information 4702. On the other hand, the EIT 4710 contains program information and fee-based program control information 4712 for the fee-based program.

Note that FIG. 26 shows that the program order control information and the fee-based program control information are contained in different EITs to be broadcasted with a commercial and a fee-based program respectively. However, the program order control information and the fee-based program control information may be contained in the same EIT.

Receiving Device

The receiving device of the second embodiment has basically the same hardware construction as in the first embodiment although the memory unit in the present receiving device stores a different control program from the first embodiment, and the CPU in the receiving device executes this control program. This results in the present receiving device performing the processing shown in FIG. 27 while receiving a broadcast from the host station in accordance with a viewer's operation. Note that the memory unit of the present embodiment stores the receiving device's phone number, which is a phone number used to phone the communication unit in the receiving device.

Figure 27:
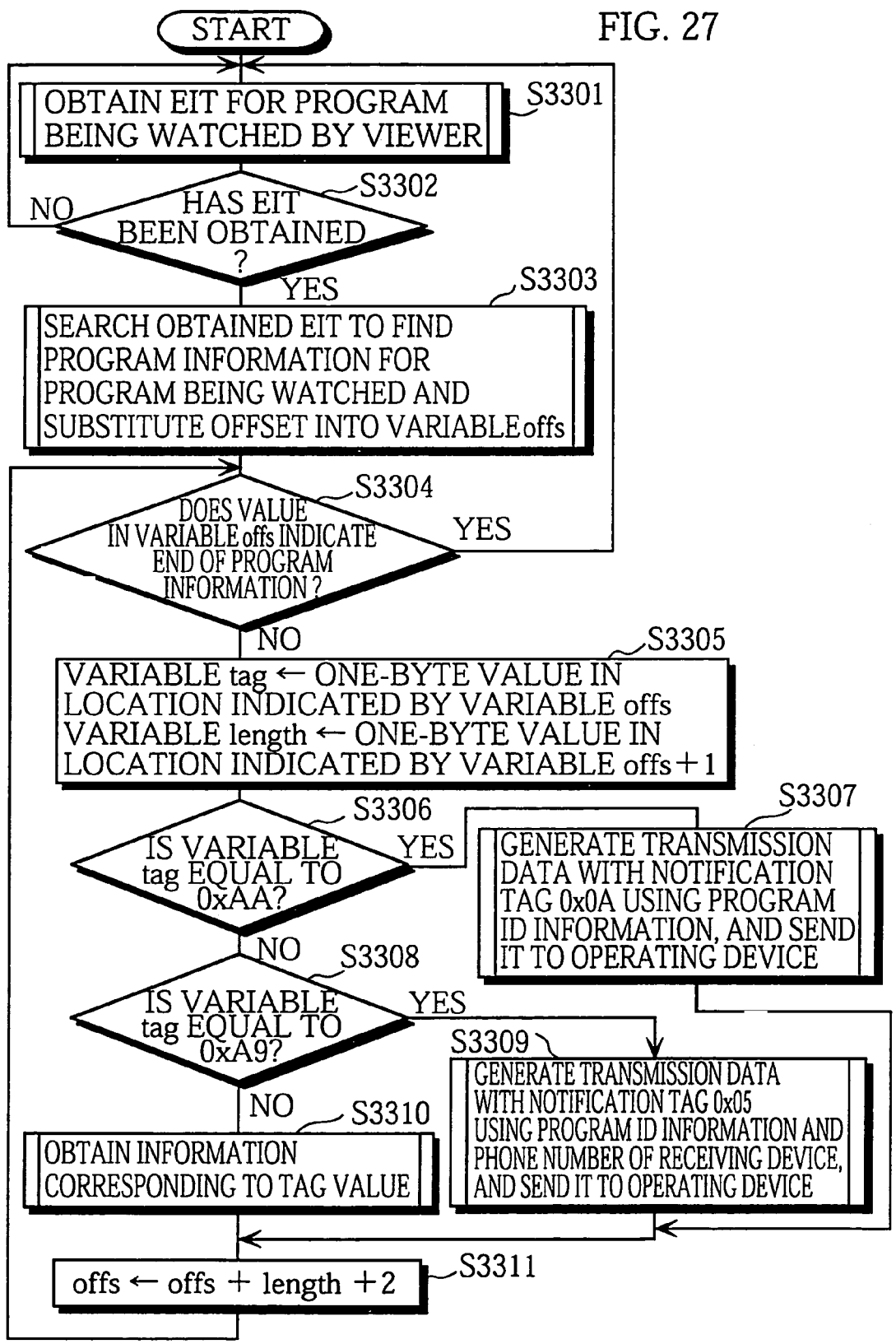
FIG. 27 is a flowchart showing the processing, which the receiving device performs while receiving a broadcast.

FIG. 27 shows the aforementioned processing by the CPU in the present receiving device. In performing this processing, the CPU controls other units such as the tuner, the demultiplexer, and the IR data send/receive unit.

The processing shown in this figure is similar to the processing in FIG. 15 although the processing after reception of the program order control information and the fee-based control information is unique to the present embodiment. The following describes this unique processing.

After finding the program information for a commercial currently being broadcasted, the CPU detects a descriptor whose tag value is 0xAA (step S3306), generates transmission data containing the program ID information, written in the detected descriptor, that specifies a fee-based program advertised in the current commercial, and controls the IR data send/receive unit to send the generated transmission data to the operating device (step S3307).

FIG. 28 shows example construction and contents of this transmission data, which the receiving device has generated in step S3307 based on the descriptor of the program order control information 4702 in FIG. 26 while receiving the commercial at the same time.

As shown in the figure, the transmission data is composed of the following fields: a notification tag field 4501 whose content is 0x0A; an nid description field 4502; a tid description field 4503; an sid description field 4504; and an eid description field 4505.

On the other hand, after finding the program information for the fee-based program currently being broadcasted, the CPU detects a descriptor whose tag value is 0xA9 (step S3308), generates transmission data by attaching a phone number of the receiving device and a notification tag 0x05 to the program ID information that is contained in the found EIT and that corresponds to the fee-based program, and controls the IR data send/receive unit to send the generated transmission data to the operating device (step S3309).

FIG. 29 shows example construction and contents of this transmission data which the receiving device generates in step S3309 based on the fee-based program control information 4712 in FIG. 26 while receiving the fee-based program.

As shown in the figure, this transmission data is composed of the following fields: a notification tag field 3101 whose content is 0x05; an nid description field 3102; a tid description field 3103; an sid description field 3104; an eid description field 3105; a phone number length description field 3106; a receiving device phone number description field 3107.

In this way, the receiving device transmits the transmission data shown in FIG. 28 to the operating device while receiving the commercial broadcast to advertise the fee-based program from the host station, and then transmits the transmission data shown in FIG. 29 to the operating device while receiving the fee-based program.

Operating Device

The operating device of the present embodiment has basically the same hardware construction as in the first embodiment (see FIG. 3) although a memory unit in the present operating device stores a different control program from the first embodiment and the CPU executes this control program. As a result, the present operating device performs the processing shown in FIG. 30 instead of the processing in FIG. 16 after receiving the transmission data from the receiving device. Note that the memory unit in the present operating device stores a membership number that identifies the viewer, that is, the user of the operating device.

Figure 30:
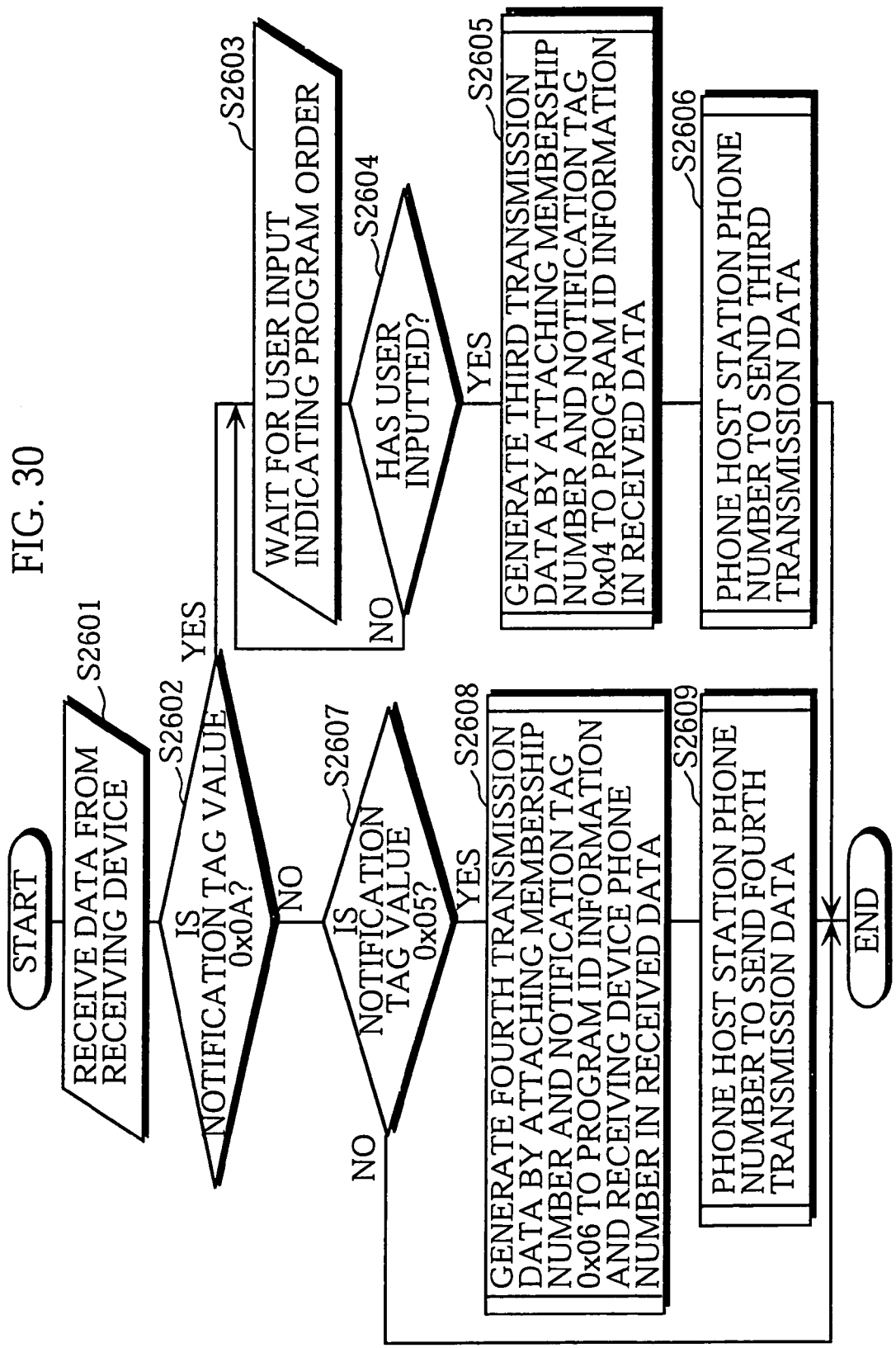
FIG. 30 is a flowchart showing the processing of the operating device that has received transmission data from the receiving device.

FIG. 30 is a flowchart showing this processing which the CPU in the present operating device performs while controlling other units such as the tuner, the multiplexer/demultiplexer, the encoder/decoder, and the IR data send/receive unit.

On receiving data via the IR data send/receive unit from the receiving device (step S2601), the CPU judges if the notification tag of the data is 0x00, 0x05, or others (steps S2602 and S2607).

When the notification tag is 0x0A, meaning that the received data has been generated based on the program order control information and sent from the receiving device during a commercial broadcast, the CPU performs the processing from steps S2603–S2606 which relates to ordering the fee-based program.

In more detail, the CPU has the display unit display a message that prompts the user to push a predetermined operating key to order the fee-based program advertised by the commercial, and awaits for the user's input (step S2603). On receiving the user's input (step S2604), the CPU generates transmission data (hereafter third transmission data) by attaching the membership number for the user and a notification tag 0x04 to the program ID information contained in the received data, which is the transmission data shown in FIG. 28 (step S2605). The CPU then controls the tuner to phone the host station and send the generated third transmission data (step S2606).

FIG. 31 shows an example construction and contents of the third transmission data which the operating device sends to the host station in step S2602 during the commercial broadcast.

As shown in the figure, the third transmission data is composed of the following fields: a notification tag field 2401 whose content is 0x04; an nid description field 2402; a tid description field 2403; an sid description field 2404; an eid description field 2405; and a membership number field 2406.

On the other hand, when judging in step S2607 that the notification tag is 0x05, meaning that the received data has been generated and sent based on the fee-based program control information during the fee-based program, the CPU performs the processing in steps S2608–S2609 to enable the user to descramble the fee-based program which he has ordered.

In more detail, the CPU generates transmission data (hereafter fourth transmission data) by attaching the membership number in the memory unit and a notification tag 0x06 to the program ID information and the receiving device phone number which are contained in the received data, which is the transmission data shown in FIG. 29 (step S2608). The CPU then controls the tuner to phone the host station and send the generated fourth transmission data to the host station (step S2609).

Figures 32, 33:
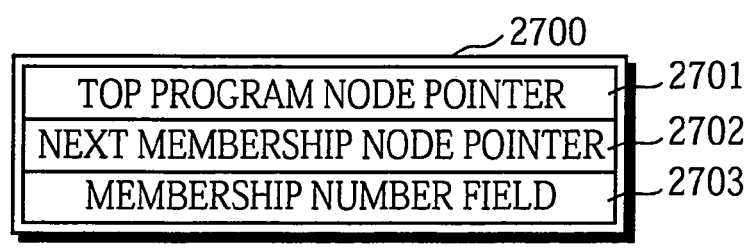
FIG. 32 shows example construction and contents of the fourth transmission data, which the operating device sends to the host station while a fee-based program is being broadcasted.
FIG. 33 shows a viewer information format.

FIG. 32 shows example construction and contents of the fourth transmission data which the operating device sent to the host station during the fee-based program.

As shown in the figure, the fourth transmission data is composed of the following fields: a notification tag field 3201 whose content is 0x06; an nid description field 3202; a tid description field 3203; an sid description field 3204; an eid description field 3205; a membership number field 3206; a phone number length description field 3207; and a receiving device phone number description field 3208.

In this way, when the viewer, who is watching a commercial broadcast for a fee-based program and has the above operating device, orders the fee-based program via the operating device, the operating device sends the program ID information for the fee-based program and the membership number of the viewer to the host station. When the viewer watches a fee-based program that has been scrambled, on the other hand, the operating device sends to the host station the program ID information for the fee-based program, the membership number for the viewer, and the phone number of the receiving device being used by the viewer to watch the fee-based program.

Reception of Data from Operating Device by Host Station

The host station of the present embodiment has basically the same hardware construction as in the first embodiment, although the memory unit in the present host station stores a different control program from the first embodiment, so that the processing of the CPU differs.

When receiving, from the operating device, the third transmission data whose notification tag is 0x04 and that relates to ordering the fee-based program, the host station stores the received third transmission data by arranging it into a viewer information format and the program information format which is shown in the first embodiment.

FIG. 33 shows the viewer information format 2700, which is composed of the following elements: a top program node pointer 2701; a next membership node pointer 2702; and a membership number field 2703. The above "membership node" refers to an information set in the viewer information format.

Figure 34:
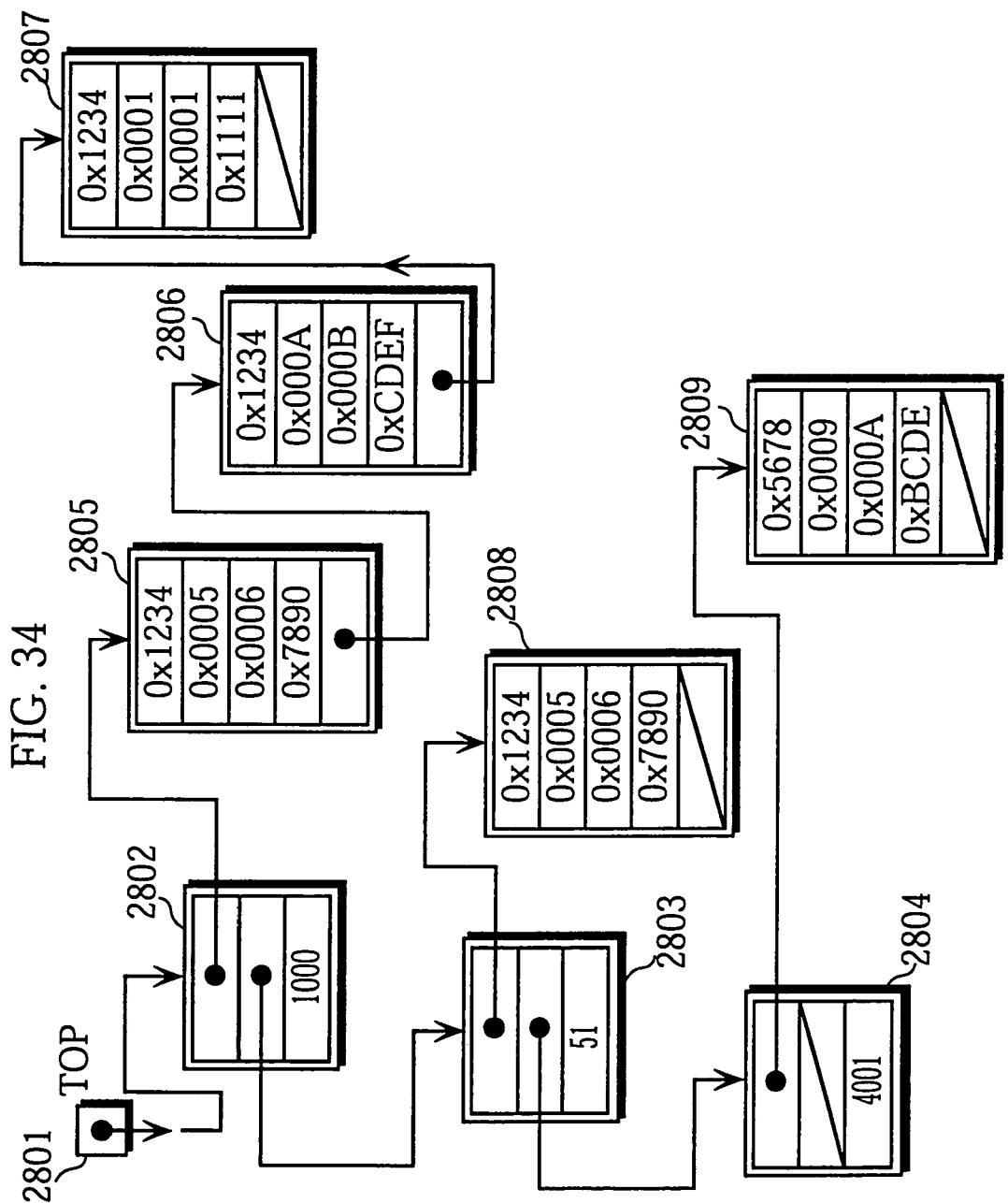
FIG. 34 shows an example state of data that has contents of a plurality of sets of the third transmission data stored by the host station using the data constructions in FIGS. 33 and 13.

FIG. 34 shows an example state of data that has contents of a plurality of sets of third transmission data stored by the host station using the data constructions in FIGS. 33 and 13.

In FIG. 34, a variable TOP 2801 represents a pointer to a start of the plurality of membership nodes (i.e., a membership node 2802 to a membership node 2804) which are chained together.

The membership node 2802 is linked to a plurality of chained program nodes 2805–2807, which have been generated based on the third transmission data sent from the operating device that stores the membership number written in the membership node 2802. Similarly, the membership node 2803 is linked to a program node 2808, and the membership node 2804 is linked to a program node 2809.

The following describes the processing by the host station that has received the third transmission data from the operating device.

Figure 35:
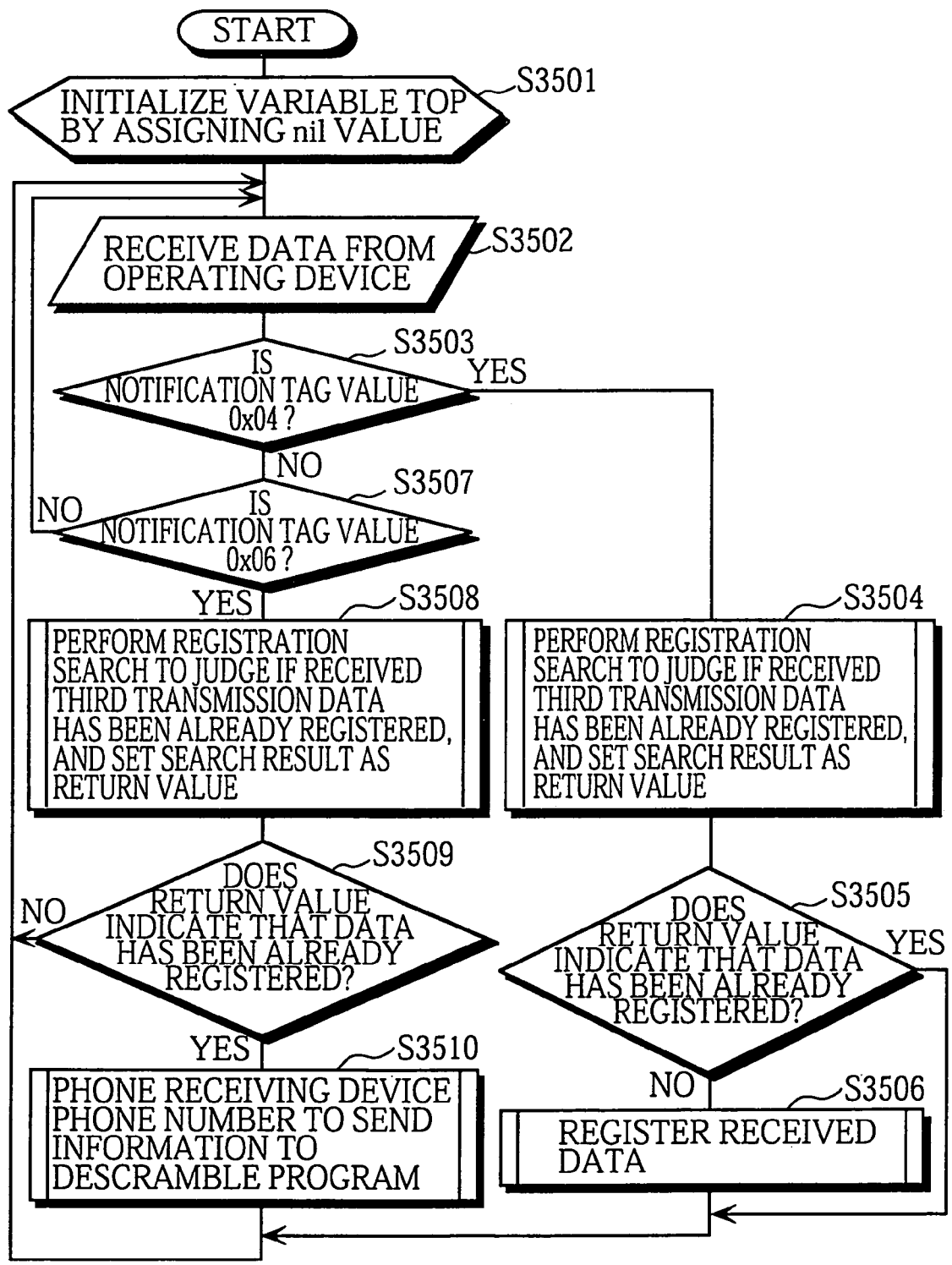
FIG. 35 is a flowchart showing the processing, which the host station of the third embodiment performs after receiving transmission data from the operating device.

FIG. 35 is a flowchart showing this processing of the host station. The CPU in the host station performs this processing by executing a control program stored in the memory unit while controlling other units such as a communication unit.

The CPU initializes the variable TOP by substituting into it nil showing that the value in the variable TOP is invalid (step S3501).

On receiving data via the communication unit from the operating device (step S3502), the CPU judges if the data is the third transmission data as shown in FIG. 31 by recognizing if the notification tag of the data is 0x04 (step S3503).

If so, the CPU searches the memory unit or the hard disk unit to judge if the received third transmission data has been already stored in the memory unit or the hard disk unit (step S3504). This search will be described later in detail.

The CPU stores the third transmission data into the memory unit or the hard disk unit (step S3506) only when it judges from the result of the search that the received third transmission data has not been stored yet (step S3505). In this way, the CPU avoids having the same third transmission data registered more than once by referring to the program ID information specifying the ordered fee-based program. Here, to "register" the third transmission data means to place the program ID information and the membership number in the transmission data into the memory unit or the hard disk unit, by arranging them into the program information format in FIG. 13 and the viewer information format in FIG. 33. This registration in step S3506 will be described in detail later.

On the other hand, on judging that the notification tag of the transmitted data is not 0x04 in step S3503, the CPU further judges if the received data is the fourth transmission data by recognizing if the notification tag of the received data is 0x06 (step S3507). If so, the CPU searches the memory unit or the hard disk unit to judge if the host station has already registered the third transmission data corresponding to the program ID information and the membership number in the fourth transmission data (step S3508). On judging so (step S3509), the CPU controls the communication unit to phone the receiving device phone number written in the received fourth transmission data and send the key information to descramble the fee-based program (step S3510).

The following describes the search in steps S3504 and S3508 in detail.

Figure 36:
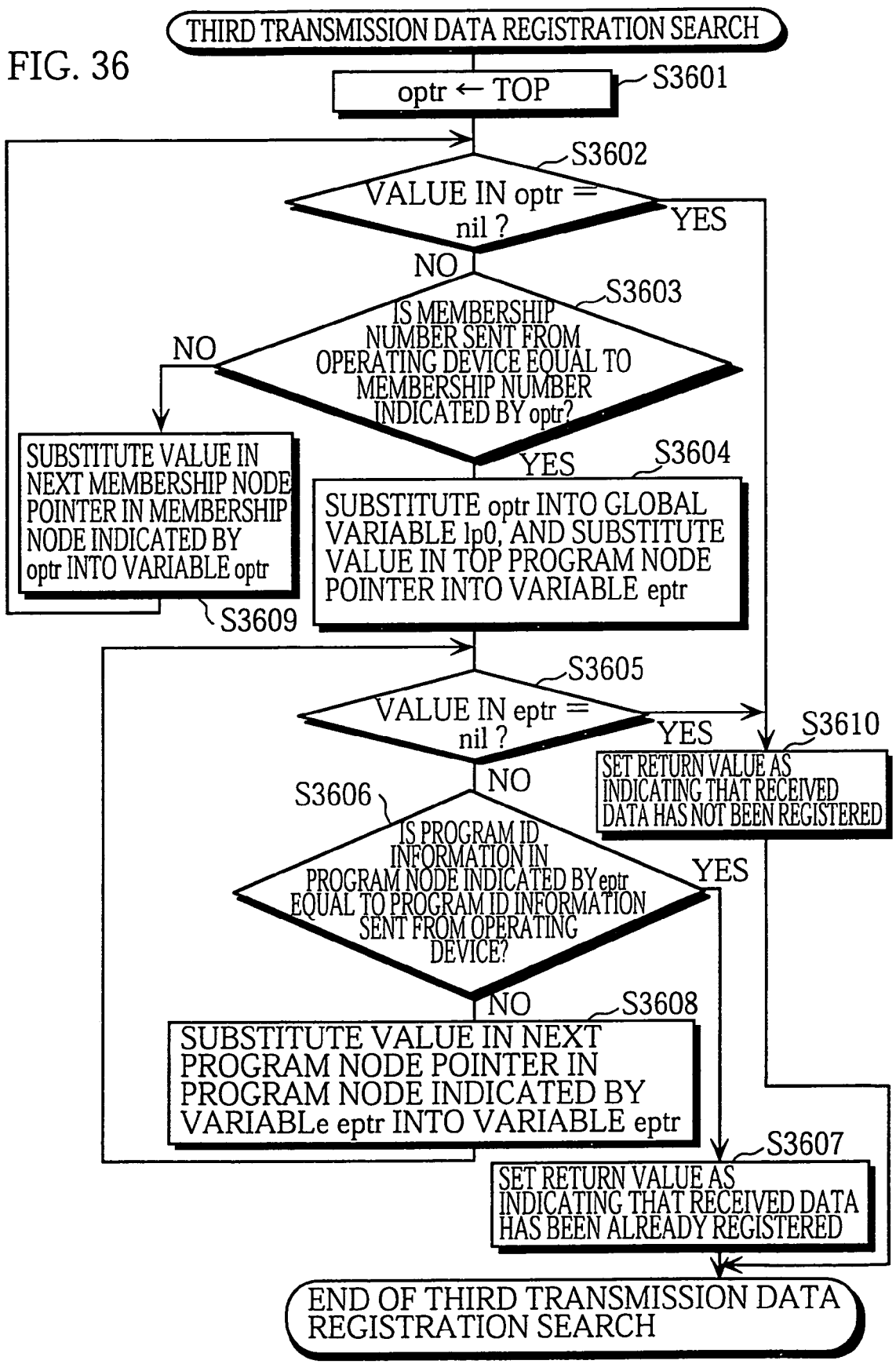
FIG. 36 is a flowchart showing the search processing performed by the CPU in the host station in the host station.

FIG. 36 is a flowchart showing the procedure for this search.

The CPU substitutes the value in the variable TOP 2801 shown in FIG. 34 into the variable optr, which is a local variable used for this search (step S3601), and judges if the variable optr is nil (step S3602). If so, the CPU 501 sets a return value as indicating that the received data has not been registered yet (step S3610), and terminates the search.

On the other hand, when judging that the global variable optr is not nil, which means that the variable optr indicates a membership node, the CPU further judges if contents of the membership number field in the membership node indicated by the variable optr are the membership number written in the received transmission data (step S3603). If not, which means that the transmission data has been sent from an operating device differing from the operating device that has the membership number contained in the membership node indicated by the variable optr, the CPU substitutes contents of the next membership node pointer in the current membership node into the global variable optr, (step S3609), and returns the control flow to step S3602 to make the judgement.

When giving the "YES" judgement in step S3603, the CPU substitutes the value in the variable optr into a global variable lp0, and substitutes the value in the top program node pointer in the membership node indicated by the variable optr into a variable eptr (step S3604). Note that the global variable lp0 is a variable whose value is to be passed to the processing to register the third transmission data in step S3506 in FIG. 35, which will be described later, while the variable eptr is a local variable used for this search processing. The CPU then judges if the variable eptr is nil (step S3605).

When giving the "NO" judgement in step S3605, which means that the variable eptr indicates a program node, the CPU judges whether the program ID information in the program node indicated by the eptr is equal to the program ID information written in the received third transmission data (step S3606). If so, the CPU sets a return value as indicating that the received third transmission data has been already registered (step S3607) and terminates the search. If not, the CPU substitutes the value in the next program node pointer in the same program node into the variable eptr (step S3608), and returns the control flow to step S3605.

On the other hand, when judging that the variable eptr is nil in step S3605, the CPU sets a return value as indicating that the received transmission data has not been registered yet (step S3610), and terminates the search.

Note that when the CPU sets a return value as indicating that the received transmission data has not been registered yet as a result of the above search, the global variable lp0 can indicate either nil or a membership node corresponding to a membership number stored by an operating device that sent the transmission data. This is to say, the global variable lp0 indicates the former when a membership node corresponding to a membership number stored by the operating device that sent the transmission data has not been registered yet, or indicates the latter when a program node corresponding to the received transmission data has not been registered although the membership node corresponding to the operating device has been already registered.

The following describes the aforementioned registration processing in step 3506 in FIG. 35.

Figure 37:
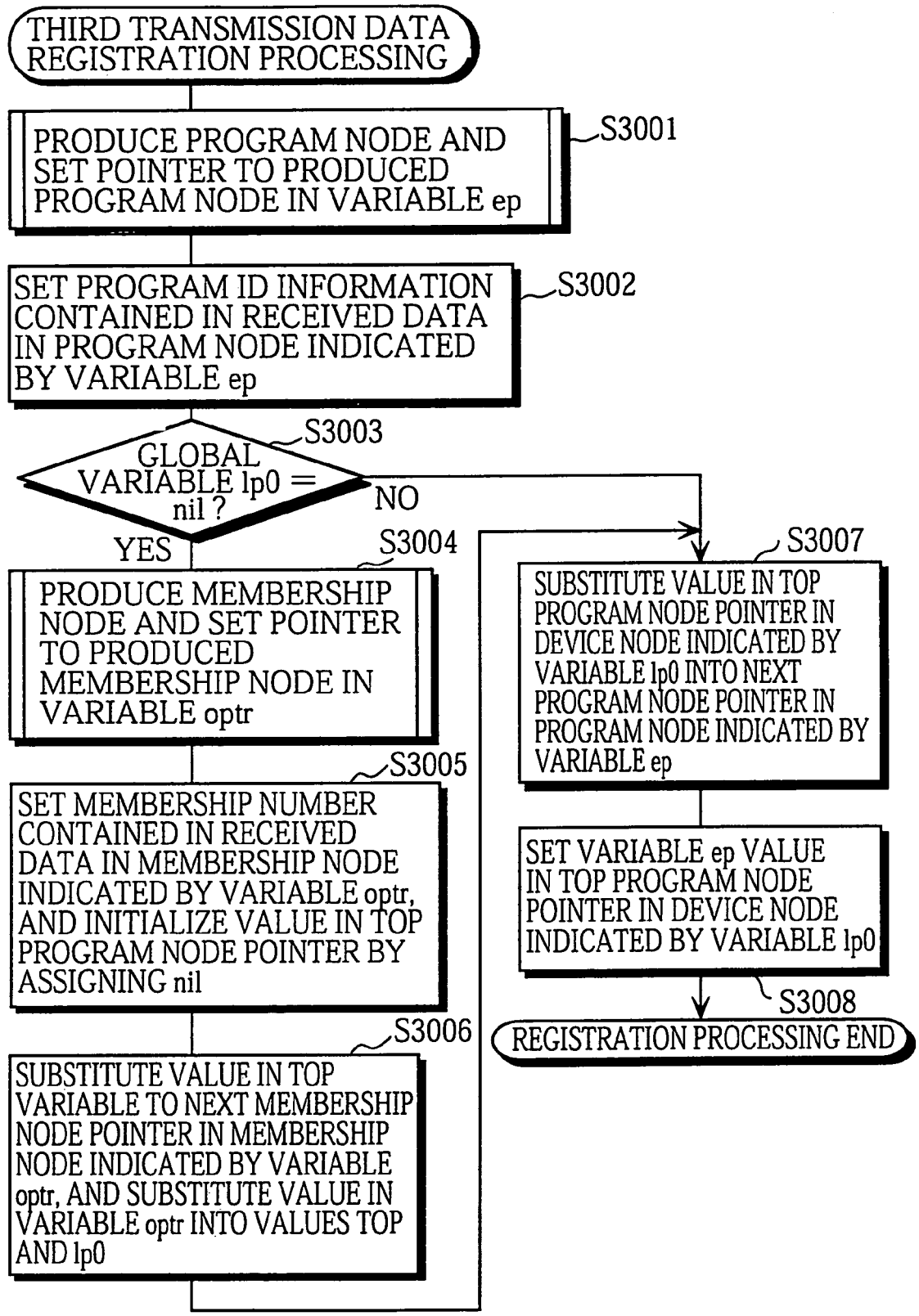
FIG. 37 is a flowchart showing the processing performed by the CPU to register the third transmission data.

FIG. 37 is a flowchart showing this registration processing performed by the CPU in the host station.

The CPU produces a program node, sets a pointer to the produced program node in a variable ep (step S3001), and sets the program ID information contained in the received third transmission data in the produced program node indicated by the variable ep (step S3002). This variable ep is a local variable used for this registration processing. Following this, the CPU judges if the global variable lp0, which has been given as a result of the search in step s3504 in FIG. 35, is nil (step S3003), and if so, which means that a membership node corresponding to the operating device that sent the third transmission data has not been produced yet, the CPU produces a membership node for the operating device, and sets a pointer to the produced device node in a local variable optr (step S3004). After this, the CPU sets the membership number contained in the received third transmission data in the membership number field of the produced membership node indicated by the local variable optr, and sets the value in the top program node pointer contained in the produced membership node at nil (step S3005). The CPU then substitutes the value in the variable TOP into the next membership node pointer in the device node indicated by the variable optr, and substitutes the value in the variable optr into the variables TOP and lp0 (step S3006). As a result, when a plurality of other membership nodes have already existed, the produced membership node is placed between the variable TOP and a start of these membership nodes, all of which are chained together.

The control flow moves to step S3007 from either step S3006 or step S3003 where the CPU has judged that the global variable lp0 is not nil. The CPU substitutes the value in the top program node pointer in the membership node indicated by the variable lp0 into the next program node pointer in the program node indicated by the variable ep (step S3007), and substitutes the value in the variable ep into the top program node pointer contained in the membership node indicated by the variable lp0 (S3008). This terminates the registration processing and results in linking the produced membership node to the produced program node at a start of a plurality of program nodes which are chained together.

For instance, when receiving the third transmission data shown in FIG. 31 from the operating device and performing the above registration in FIG. 37, the host station stores data in a state as shown in FIG. 34, where a program node 2805 has been produced and placed in the chained construction.

The above processing shown in FIGS. 35–37 by the host station allows the viewer, who is watching a commercial broadcast advertising a fee-based program, to order the fee-based program by performing a simple operation such as pushing an operating key (a "pay" key) on his operating device. Thereafter, once the receiving device has received and displayed the scrambled fee-based program, the viewer can descramble and watch the fee-based program. If the viewer carries the operating device with him, he can order a fee-based program while watching a commercial broadcast for a fee-based program using one receiving device that receives and presents a digital broadcast, and watch the fee-based program using another receiving device similar to the former receiving device, since the host station sends key information for the descrambling to the latter receiving device.

Supplementary Explanation

The above first to third embodiments have been used to describe the digital broadcast system of the present invention although it should be clear that the present invention is not limited to these embodiments. Possible modifications are described below.

1. The number of receiving devices, operating devices, and host stations in the digital broadcast system is not limited to the number shown in FIG. 1, which is to say, the digital broadcast system may comprise any number of receiving devices, operating devices, and host stations.

2. The first to third embodiments describe the host station as one device that broadcasts a digital broadcast in addition to providing services such as selection of a prizewinner and transmission of a message to notify a viewer that his quiz answer is correct and the key information for the descrambling in accordance with data sent from the operating device. However, it is alternatively possible for the host station to only broadcast a digital broadcast and for another device to receive data from the operating device and provide services in accordance with the received data. This is to say, transmission of a digital broadcast and processing to provide services may be performed separately by different devices.

3. The receiving device for the first to third embodiments uses an IR signal to send data to one or more operating devices although the receiving device may alternatively use a different transmission method, such as a radio wave, to send the data.

In order to provide a service to a viewer as soon as he watches a broadcasted digital program reproduced by the receiving device, it is appropriate for the receiving device to use a transmission method such as an IR signal or a radio wave that has a small output of 1.0 mW or lower to send data to the viewer's operating device at a small distance from the receiving device.

In the first to third embodiments, the operating device uses a public phone network to send data to the host station, although the operating device may use a different network such as a dedicated network instead of the public phone network.

The operating device of the present invention does not need to have a function of a cellular phone if the operating device is capable of sending data to the host station. This is to say, the operating device may alternatively be other devices such as a Personal Handyphone System (PHS), a radio device, or a conventional home telephone, although in order to provide a service to each viewer in accordance with a program he is watching, the operating device should be portable to enable each viewer to take it with him.

4. In the first to third embodiments, the host station broadcasts a program using an MPEG2 transport stream according to the ISO/IEC 13818 and the program-related information according to the DVB-SI although the host station may alternatively use other methods to broadcast the program and the program-related information.

Instead of the combination of the nid, the tid, the sid, and the eid used in the above embodiments, a combination of Bouquet_id, Service_id, and Event_id according to the DVB-SI may be used as the program ID information.

The host station does not necessarily have to send information such as the program ID information specifying a program the viewer is watching while broadcasting the program at the same time as long as this information can be obtained by the receiving device when the viewer watches the program. For instance, the receiving device may obtain the information specifying the program via the Internet or the like, based on the channel used for the program, a time at which the receiving device has received the program, or other such information.

5. In the first to third embodiments, the nid, the tid, the sid, and the eid which specify a program watched by the viewer are sent from the receiving device to the operating device. The operating device then attaches other information to the received program ID information and sends it to the host station, which then provides a predetermined service for the program such as selecting a prizewinner. However, the nid, the tid, the sid, and the eid are generally capable of only specifying a program broadcasted during a predetermined period. Therefore, it is possible for the receiving device to insert broadcast starting time information that corresponds to the program and that is contained in an EIT, into the program ID information and to send this program ID information to the operating device. By doing so, even when the viewer watches a previously-recorded program after the above predetermined period has passed, the host station is capable of specifying the program watched by the viewer and providing an appropriate service appropriately.

The above broadcast starting time information may be in the MJD (Modified Julian Date) format to be stored in an EIT. FIG. 38 shows example contents and the construction of transmission data that contains the program ID information containing the broadcast starting time information. The receiving device may transmit this transmission data instead of transmission data shown in FIG. 10. This broadcast starting time information may be replaced with other information that shows a broadcast starting time for the program.

The receiving device may send time information showing when it reproduced a program in addition to the program ID information to the operating device, and the operating device may generate and send transmission data containing this information to the host station. As a result, the host station can provide a service while considering when the program has been reproduced. This is useful, for instance, for a service provided to the viewer only if he watches the program during a predetermined period. It is alternatively possible for the operating device to directly send the above information on a reproduction time along with the program ID information, which has been sent from the receiving device, and other information to the host station.

6. In the first to third embodiments, the receiving device sends data containing the program ID information to the operating device, and the operating device attaches its phone number or the membership number of the viewer to the received data and sends them to the host station. However, it is alternatively possible to exclude such operating devices from the present digital broadcast system and to have the receiving device send information specifying itself such as its phone number along with the program ID information. This modified digital broadcast system still allows the host station to provide a service, such as sending the key information for descrambling, in accordance with a program watched by the viewer. However, in order to provide a service to not each receiving device but each viewer, the digital broadcast system should include operating devices provided to each viewer.

7. In the first to third embodiments, the operating device stores a phone number of the host station in advance although this is not necessary, and the operating device may obtain the phone number when necessary. This can be achieved, for instance, by inserting a phone number of a device that performs operations to provide services into the program-related information and by having the host station broadcast the program-related information. The receiving device then obtains the device phone number from the program-related information and sends this phone number with the program ID information to the operating device, which then phones the device phone number to send data such as the program ID information.

8. The first to third embodiments state that the host station broadcasts data into which the control instructing information and a program have been multiplexed, and the receiving device starts sending the program ID information on receiving this control instructing information. However, the receiving device may start sending the program ID information on detecting that it has received the viewer's operation to reproduce the program or switch to reproduction of another program.

9. In the first embodiment, the CPU in the host station controls the communication unit to send a message to inform the viewer of his winning a prize in step S4307, although the host station may display the phone number of the prizewinner's operating device on the monitor, and an operator at the host station may phone the number displayed on the monitor to notify the prizewinner, instead.

The method to select a prizewinner for a program offering a prize is not limited to the method described in the first embodiment, and may be any other method instead.

10. In the second embodiment, the CPU in the host station controls the communication unit to send a message to notify the viewer that his answer to a quiz question is correct in step S2205. Other than this service, the host station may provide a variety of services such as notifying the viewer of how many other viewers have already answered the quiz question correctly or sending a message to notify the viewer that his answer is incorrect. Note that the second embodiment describes that the digital broadcast system broadcasts a quiz show and provides the related services, although this is only an example, and the digital broadcast system of the present invention enables the host station to provide any other services in accordance with a program watched by the viewer and data that has been sent via the operating device from the viewer.

11. The membership number described in the third embodiment may have been notified by each viewer to the host station in advance, or may be replaced with a phone number of the operating device owned by the viewer or with any other information to identify the viewer.

The host station may charge each viewer based on the third transmission data sent from the viewer that the host station has registered.

In the third embodiment, the term "fee-based" program is used to suggest that the program has been scrambled before being broadcasted, and therefore this "fee-based" program can also include a program at no charge that has been scrambled before being broadcasted.

12. In the third embodiment, the receiving device sends information for a fee-based program such as the program ID information via the operating device to the host station, starting from when the receiving device has displayed the fee-based program that has been scrambled. On receiving the sent information, the host station sends the key information for descrambling to the receiving device, which then descrambles and reproduces the fee-based program. However, it is alternatively possible for the operating device to attach its phone number to the program ID information before sending it to the host station and for the host station to send the key information to the operating device by calling the phone number. In this case, the operating device may send the key information to the receiving device via an IR signal or the like. Once receiving the program ID information for the program being watched by the viewer, the host station may send to the receiving device or the operating device, the key information for descrambling a program to be broadcasted after the current program via the same channel as used for the current program.

13. In the third embodiment, the operating device sends the third transmission data shown in FIG. 31 to the host station to order a fee-based program. However, it is alternatively possible for the operating device to send its phone number together with the third transmission data to the host station, and for the host station to provide a service to inform the viewer that the broadcast starting time for the ordered fee-based program has come by phoning the sent phone number.

14. The procedures of the host station, the receiving device, and the operating device such as shown in the flowcharts of the above embodiments may be achieved by programs in machine language, with recording media storing these programs being distributed. These recording media can be IC cards, optical discs, flexible discs, ROMs, or other media, with the machine language programs recorded on the media being installed into a device that has a function to execute a machine program. This device executes the installed machine language programs, thereby realizing the host station, the receiving device, and the operating device of the above embodiments.

Also, the above computer programs to perform the procedures of the host station, the receiving device, and the operating device may be distributed and sold online using communication lines, or using recording media such as hard disks.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

The invention claimed is:

1. A digital broadcast system, comprising:
a receiving device, one or more communication devices, and a broadcast station device, wherein
control instructing information is multiplexed with a program,
(i) the receiving device includes:
receiving means for receiving a digital broadcast of a program together with the multiplexed control instructing information;
presenting means for presenting the program received by the receiving means to a viewer; and
program ID information sending means for sending program ID (identification) information that specifies either the presented program or a program related to the presented program to each of the communication devices when having detected the control instructing information, the program ID information sending means sends the program ID information by transmitting either an IR (infrared) signal or a radio wave whose output is 1.0 mW or lower, wherein the receiving means includes a demultiplexer for demultiplexing the multiplexed control instruction information, and sends the demultiplexed control instructing information to the program ID information sending means, (ii) each of the communication devices receives the sent program ID information and sends device ID information that specifies the communication device to the broadcast station device together with the received program ID information, (iii) the broadcast station device includes:

service processing means for receiving the program ID information and the device ID information from each of the communication devices, and sending service information, which is for the viewer of the presented program and is information related to the program specified by the program ID information, to each of the communication devices specified by the device ID information, (iv) each of the communication devices further includes:

service information receiving means for receiving the service information, (v) each of the communication devices is a portable phone and includes:

program ID information receiving means for receiving the sent program ID information;

target phone number storage means for storing a phone number of the broadcast station device;

own phone number storage means for storing a phone number of the communication device as the device ID information; and transmission means for telephoning the phone number stored by the target phone number storage means and sending the program ID information and the phone number stored by the own phone number storage means to the broadcast station device via a telephone line, (vi) the service information receiving means also informs the viewer about the received service information, and (vii) the service processing means telephones the sent phone number of each of the communication devices and sends a message for informing the viewer as the service information via a telephone line.

2. The digital broadcast system of claim 1, wherein
the program ID information is additionally multiplexed with the program,
the receiving means also receives the program ID information, and
the program ID information sending means sends the program ID information that has been received by the receiving means.

3. The digital broadcast system of claim 1, wherein
each of the communication devices also sends, to the broadcast station device, playback time information showing a time at which the presenting means presented the program, and
the service information sent to the communication device is about a service based on the sent playback time information.

4. The digital broadcast system of claim 1, wherein
the program presented by the presenting means is a commercial advertising another program, and the sent program ID information is used for specifying the advertised program,
each of the communication devices sends a phone number of the communication device as the device ID information together with the received program ID information to the broadcast station device when receiving a predetermined operation from the viewer, and the service processing means telephones the sent phone number of the communication device, and sends the service information which informs the viewer of a broadcast starting time for the program specified by the program ID information via a telephone line.

5. A digital broadcast system, comprising:

a receiving device, one or more communication devices, and a broadcast station device, including means for multiplexing control instructing information with a program, (i) the receiving device includes:

receiving means for receiving a digital broadcast of a program together with the multiplexed control instructing information;

presenting means for presenting the program received by the receiving means to a viewer; and program ID information sending means for sending program ID (identification) information that specifies either the presented program or a program related to the presented program to each of the communication devices when having detected the control instructing information, the program ID information sending means sends the program ID information by transmitting either an IR (infrared) signal or a radio wave whose output is 1.0 mW or lower, wherein the receiving means includes a demultiplexer for demultiplexing the multiplexed control instruction information, and sends the demultiplexed control instructing information to the program ID information sending means, (ii) each of the communication devices receives the sent program ID information and sends device ID information that specifies the communication device to the broadcast station device together with the received program ID information, (iii) the broadcast station device includes:

service processing means for receiving the program ID information and the device ID information from each of the communication devices, and sending service information, which is for the viewer of the presented program and is information related to the program specified by the program ID information, to each of the communication devices specified by the device ID information, (iv) each of the communication devices further includes service information receiving means for receiving the service information, (v) each of the communication devices is a portable phone and includes:

program ID information receiving means for receiving and storing the sent program ID information, target phone number storage means for storing a phone number of the broadcast station device;

a phone number storage means for storing a phone number of the communication device as the device ID information;

(vi) generating means for automatically attaching the device ID information to the program ID information as transmission data, when the viewer enters a response to the program;

(vii) transmission means for telephoning the phone number stored by the target phone number storage means and sending the transmission data including the device ID information and the program ID information to the broadcast station device via a telephone line, (viii) the service information receiving means also informs the viewer about the received service information, and (ix) the service processing means telephones the sent phone number of each of the communication devices and sends a message for informing the viewer as the service information via a telephone line.

* * * * *